United States Patent [19]
Tanaka et al.

[11] Patent Number: 5,332,789
[45] Date of Patent: Jul. 26, 1994

[54] POLYPROPYLENE BLOCK COPOLYMER RESIN AND COMPOSITIONS

[75] Inventors: Akira Tanaka; Masaru Nakagawa; Hideo Kusuyama; Sueto Miyazaki; Tatsuya Housaki, all of Ichihara, Japan

[73] Assignee: Idemitsu Petrochemical Co., Ltd., Tokyo, Japan

[21] Appl. No.: 974,591

[22] PCT Filed: Jun. 25, 1992

[86] PCT No.: PCT/JP92/00807
§ 371 Date: Feb. 26, 1993
§ 102(e) Date: Feb. 26, 1993

[87] PCT Pub. No.: WO93/00375
PCT Pub. Date: Jan. 7, 1993

[30] Foreign Application Priority Data

| Jun. 27, 1991 | [JP] | Japan | 3-183257 |
| Jun. 28, 1991 | [JP] | Japan | 3-183629 |
| Jun. 28, 1991 | [JP] | Japan | 3-183630 |
| Jun. 28, 1991 | [JP] | Japan | 3-183631 |
| Jun. 28, 1991 | [JP] | Japan | 3-183633 |
| Jun. 28, 1991 | [JP] | Japan | 3-183634 |

[51] Int. Cl.$^5$ .................................. C08F 210/06
[52] U.S. Cl. ................................ 525/323; 525/88; 525/95; 525/240; 525/247; 525/319; 525/324; 526/124; 526/125; 526/351; 526/905
[58] Field of Search .......... 526/351; 525/323, 88, 525/95, 240, 247, 324, 319

[56] References Cited

U.S. PATENT DOCUMENTS

| 4,981,938 | 1/1991 | Hanari et al. | 525/323 X |
| 5,077,341 | 12/1991 | Saito et al. | 525/323 X |
| 5,141,994 | 8/1992 | Kakugo et al. | 526/351 X |

FOREIGN PATENT DOCUMENTS

| 58-138721 | 8/1983 | Japan . |
| 59-113006 | 6/1984 | Japan . |
| 2-33047 | 7/1990 | Japan . |
| 3-30605 | 5/1991 | Japan . |

*Primary Examiner*—Fred Teskin
*Attorney, Agent, or Firm*—Oblon, Spivak, McClelland, Maier & Neustadt

[57] ABSTRACT

Polypropylene based resins and compositions comprising the resin having extremely high stiffness, heat resistance and impact strength, with these properties being well-balanced, are provided. The polypropylene based resins are characterized by comprising:

(1) a propylene polymer having a content of alpha-olefin other than propylene of not more than 4 mole percent, and the following properties (2), (3) and (4):
(2) a pentad fraction (mmmm fraction) measured by $^{13}$C-NMR of not less than 96.0 percent,
(3) a main elution fraction peak position of not less than 118.0° C. and a peak half value width of less than 4.0, these values being measured by the temperature raising separation method, and
(4) an intrinsic viscosity of not less than 0.5 dl/g, but not more than 5.0 dl/g; and,
(5) a rubber content measured by pulse NMR of more than 25 percent.

5 Claims, 2 Drawing Sheets

POLYPROPYLENE BLOCK COPOLYMER RESIN AND COMPOSITIONS

FIELD OF THE INVENTION

The present invention relates to a polypropylene based resin having extremely high stiffness, good heat resistance and high impact strength and a resin composition comprising the resin.

Further, the present invention relates to a polypropylene resin having high stiffness and good heat resistance as well as having good dimensional stability resulting in prevention of warping or deformation of the resulting product.

Further, the present invention relates to a polypropylene resin which exhibits high stiffness and high impact strength and thus is useful in a wide variety of fields such as automotive, electrical appliances or the like.

Furthermore, the present invention provides a less expensive polypropylene resin having high stiffness and high impact strength and high melt tension, and a resin composition comprising the resin.

RELATED ART

In general, polymers prepared from homopolymerization or copolymerization of propylene in a first stage and random copolymerization of propylene and the other alpha-olefin in a second stage, are called propylene block copolymers. These block copolymers are drastically improved in low temperature impact strength without substantially sacrificing good properties of polypropylene, i.e., high stiffness and good heat resistance.

Heretofore, propylene block copolymers are produced by a method which comprises subjecting propylene to homopolymerization or copolymerization in the presence of a high stereoregular catalyst in the former polymerization step in a homopolymerization vessel, and then subjecting propylene and the other alpha-olefin to random copolymerization in the presence of the homopolymer or copolymer obtained as above in the latter polymerization step in a random copolymerization vessel.

As mentioned above, in the presence of a highly stereoregular catalyst, propylene/olefin copolymerization is carried out one after another to improve impact strength. However, as the copolymerized portions increase, the stiffness decreases. Good balance of stiffness and impact strength has not been sufficiently achieved.

In the meanwhile, techniques to improve impact strength of a propylene block copolymer is known (Japanese Patent Application Publication Nos. 23565/1991 and 26203/1991). Either of these techniques improves stereoregularity of the propylene homopolymers. However, the improvement is still within the prior art level, and improvement in stiffness and heat resistance is not sufficient.

Further, according to the technique disclosed in Japanese Patent Application Laid-Open No. 187043/1984, the resultant polymers have extremely poor impact strength when compared with a polymer having the same amount of copolymerized portion since formulation control of the copolymerized portion is not sufficient. Thus, it cannot be said that balance of stiffness and impact strength is sufficient.

The present invention was made in view of the above situations, and has its object of providing a polypropylene based resin having extremely high stiffness, good heat resistance and high impact strength.

Further, in the field of injection-molding using a polypropylene resin, in order to improve stiffness and heat resistance of the resin itself, it is generally conducted to broaden molecular weight distribution by way of a multi-stage polymerization or the other methods, and then keeping molecular orientation in the molding stage. However, in this method, after molding the product suffers large shrinkage and anisotropy. Particularly, in the case of producing precise parts and large products, a problem readily occurs due to warping or deformation of the products, or poor engagement of the molded products. It is desired to overcome these problems.

On the other hand, to improve the above-mentioned molding shrinkage, it is adapted to narrows molecular weight distribution of a polypropylene resin by way of decomposition using peroxide. However, this method has a problem in that decrease in mechanical and physical properties such as stiffness and heat resistance is substantial to extent that the decrease cannot be ignored. Thus, this method does not provide substantial improvement.

The present invention was made in view of the above situations, and has another object of providing a polypropylene resin having excellent stiffness and heat resistance as well as having good dimensional stability, capable of preventing warping or deformation of the products due to shrinkage derived from molecule orientation during the injection-molding, and thus useful as industrial materials in several fields.

Further, a polypropylene resin alone is not sufficient in stiffness and heat resistance. Thus, fiber reinforced polypropylene resins filled with glass fibers or the like or filler containing polypropylene resins having high heat resistance are used as industrial materials for various parts for automotive (including interior materials), parts for electrical appliances and the like.

On the contrary, to improve stiffness and heat resistance of a polypropylene resins, it is proposed to improve pentad fraction (mmmm fraction) measured by NMR (Japanese Patent Application Publication No. 33047/1990). However, such improvement alone is not sufficient, although it is can be used as a reference for improvement in stiffness, since the mmmm fraction measured by NMR merely indicates consecutive five isotactic fractions.

Further, in this technique, certain effects can be expected if a process capable of separating isotactic components such as solvent polymerization is used. However, this technique cannot be applicable to a process such as gas phase polymerization in which a whole amount of the resultant polymer become the final product. It was actually confirmed that meritorious effects could not be obtained from a such process.

Further, improvement only to the pentad fraction measured by NMR can be achieved by, for example, drastically changing the polymerization temperature or further adding an electron donor. However, such process drastically reduces productivity and thus is not cost effective.

As mentioned above, improvement to the pentad fraction measured by NMR has been made to improve stiffness and heat resistance of polypropylene. However, improvement only to the pentad fraction cannot give sufficient stiffness and heat resistance. Thus, it is desired to improve these properties.

The present invention was made in view of the above situations, and has another object of providing a polypropylene resin which has extremely high stiffness and heat resistance, and thus can be used, as it is, as industrial materials for various parts for automotive, electrical appliances and the like.

Further, polypropylene resins, particularly those having low melt index (MI) have been used as plastics materials for sheets, films or the like.

It is desired to provide a technique to improve stiffness and heat resistance of a polypropylene resin in the extrusion molding techniques for low MI grade polypropylene sheets or films.

Further, in multi-stage polymerization, it is desired to improve productivity and cost performance since the multi-stage polymerization is necessarily used to obtain sufficient melt tension in the low MI grade area.

On the contrary, it is proposed to improve the pentad fraction measured by NMR and boiling heptane soluble fraction (II) to improve stiffness and heat resistance of a polypropylene resin (Japanese Patent Application Publication No. 30605/1991). However, such improvement alone is not sufficient although the pentad fraction or the boiling heptane soluble fraction can be used as a reference for improvement in stiffness and heat resistance.

Further, the conventional techniques requiring multi-stage polymerization (Japanese Patent Applications Laid-Open Nos. 284252/1988 and 317505/1988) have a problem in that there are many restrictions in a process or cost effectiveness and stereoregularity and molecular weight distribution may be broaden due to combination of polymerization steps under different conditions. In other words, the resultant polymers have good average stereoregularity and molecular weight, but should have small amount of components having poor stereoregularity and having low molecular weight, resulting in unsolved quality problems (particularly in gas phase polymerization).

The present invention was made in view of the above situations, and have another object of providing a less expensive polypropylene resin having extremely high stiffness, good heat resistance and high melt tension.

DISCLOSURE OF INVENTION

Although the present inventors found that polypropylene having a specific resin structure has extremely improved stiffness and heat resistance, intensive studies were further made on propylene block copolymers having such a specific resin structure to achieve the above-mentioned objects. As a result, it was found that a certain polypropylene block copolymer exhibits well-balanced stiffness and impact strength with keeping stiffness and heat resistance of the polypropylene having the above specific resin structure. The present invention is based on these findings.

Further, the present inventors made intensive studies to achieve the above objects, as a result, it was found that main elution peak position and the peak half value width measured by the temperature raising separation method, which will be described later, affect stiffness and heat resistance of a polypropylene resin. The present invention was made based on the finding that a polypropylene resin shows good dimensional stability, extremely high crystallization degree and melt temperature, resulting in extremely high stiffness and heat resistance when (1) the pentad fraction, (2) the main elution peak position and the peak half value width measured by the temperature raising separation method, which will be described later, and (3) the molecular weight distribution index (PDi) represented by the formula described below are within prescribed ranges.

Further, the present inventors made intensive studies to achieve the above objects, as a result, it was found that the main elution peak position and the peak half value width measured by the temperature raising separation method affect stiffness and heat resistance. The present invention was made based on the findings that a polypropylene resin shows extremely high stiffness and heat resistance, and good moldability and anti-draw down property when (1) the pentad fraction, (2) the main elution peak position and the half value width measured by the temperature raising separation method, (3) the melt index and (4) the relation between the melt tension and the melt index, are within prescribed ranges.

Accordingly, the first embodiment of the present invention provides a polypropylene based resin characterized by comprising:

(1) a propylene polymer having a content of alpha-olefin other than propylene of not more than 4 mole percent, and the following properties (2), (3) and (4):

(2) a pentad fraction (mmmm fraction) measured by $^{13}$C-NMR of not less than 96.0 percent, (3) a main elution fraction peak position of not less than 118.0° C. and a peak half value width of less than 4.0, these values being measured by the temperature raising separation method, and (4) an intrinsic viscosity of not less than 0.5 dl/g, but not more than 5.0 dl/g; and, (5) a rubber content measured by pulse NMR of more than 25 percent.

The first embodiment of the present invention will be described in more detail.

First, each property will be described in detail.

(1) Content of Alpha-olefin Other Than Propylene

The polypropylene based resins according to the present invention comprise not more than 4 mole percent, preferably 0 to 2 mole percent of alpha-olefin other than propylene, i.e., ethylene and/or alpha-olefins having at least 4 carbon atoms. If the content of alpha-olefin other than propylene exceeds 4 mole percent, the stiffness and heat resistance of the resultant polymers will be insufficient.

The polypropylene based resin according to the present invention contain a propylene copolymer having the following properties (2), (3) and (4).

(2) Pentad Fraction (mmmm Fraction)

As used herein, the "pentad fraction (mmmm fraction)" means a value measured by $^{13}$C-NMR.

The propylene copolymers contained in the polypropylene based resins according to the present invention comprise a pentad fraction measured by $^{13}$C-NMR of at least 96.0 percent, preferably at least 97.0 percent, more preferably at least 97.5 percent. If the pentad fraction is less than 96.0 percent, the stiffness and the heat resistance of the resultant polymers will be insufficient.

(3) Main Elution Peak Position and Peak Half Value Width Measured By the Temperature Raising Separation Method These values can be measured by introducing a sample solution into a column to make the sample solution adsorbed to a filler, raising the column temperature and detecting concentration of the polymer solution eluted at each temperature.

As used herein, "Main Elution Peak Position (Tmax)" and "Peak Half Value Width ($\sigma$)" are values defined by an analysis chart as shown in FIG. 1. In other words, the main elution peak position means the peak position (temperature) when the biggest peak appears. The peak half value width means the peak width at a position where the height of peak is half of the biggest peak.

Stereoregularity of a polymer depends on elution temperature. Thus, stereoregularity distribution of a polymer can be evaluated by measuring the relation between the elution temperature and the polymer concentration by the temperature raising separation method.

The propylene polymers contained in the polypropylene based resins according to the present invention, have a main elution peak position of at least 118.0° C., preferably at least 118.5° C., more preferably at least 119.0° C. Further, the peak half value width is less than 4.0, preferably less than 3.8, more preferably less than 3.4. If the main elution peak position is less than 118.0° C., the stiffness and heat strength of the resultant polymer will be decreased. Further, if the peak half value width is 4.0 or more, the stiffness and heat resistance of the resultant polymer will be also insufficient.

(4) Intrinsic Viscosity [$\eta$]"

As used herein, the "Intrinsic Viscosity" means a value measured in decalin at 135° C.

The propylene polymers contained in the polypropylene based resins according to the present invention have an intrinsic viscosity of 0.5 to 5.0 dl/g, preferably 0.9 to 5.0 dl/g, more preferably 1.0 to 5.0 dl/g. If the intrinsic viscosity is less than 0.5 dl/g, the impact strength of the resultant polymer will be insufficient. If the intrinsic viscosity exceeds 5.0 dl/g, the moldability of the resultant polymer will be poor.

(5) Rubber Component Content

As used herein, the "Rubber Component Content" means a value obtained from the Pulse NMR analysis made under the following conditions. Analysis: In accordance with the techniques by Nishi et al (K. Fujimoro, T. Nishi and R. Kado, Polym. J., 3.448(1972)), FID (Free Induced Decrease) is separated into three components showing different $^1$H spin-glide relaxation time (T2H). Then, among these three components, a component having the longest T2H is regarded as a rubber component, and the content of such fraction is defined as rubber component content.

The polypropylene based resin according to the present invention have a rubber component content measured by the Pulse NMR of more than 25 percent, preferably 30 to 70 percent, more preferably 30 to 60 percent. If the rubber component content is 25 percent or less, the Izod impact strength of the resultant polymer will be decreased as shown in FIG. 2.

A process for producing the polypropylene based resin, according to the present invention, having the above-mentioned properties is not particularly limited. However, it is preferable to use polymerization catalysts which exhibit high polymerization activity and stereoregularity.

These polymerization catalysts and a process for producing polyolefins using the polymerization catalysts are disclosed in, for example, Japanese Patent Application No. 413883/1990 previously filed by the present applicant.

The polymerization catalysts disclosed in Japanese Patent Application No. 413883/1990 are characterized by using as a carrier a solid product (a) prepared by the reaction of metallic magnesium, alcohol and a specific amount of halogen. The polymerization is carried out in the presence of a solid catalyst component (A) prepared using the solid product (a) and a titanium compound (b), and if desired an electron donor compound (c); an organometallic compound (B); and if desired an electron donor compound (C).

The solid products (a) are prepared from metallic magnesium, alcohol, and halogen and/or a halogen-containing compound.

In this case, the metallic magnesium may be in any form, such as granule, ribbon, and powder. Also, the metallic magnesium may preferably be those free of magnesium oxide film covering the surface, although no specific restrictions are placed on its surface state.

The alcohol is not specifically limited; but it should preferably be a lower alcohol having 1–6 carbon atoms. Ethanol is particularly desirable, because it gives a solid product which greatly improves the catalyst performance. The alcohol may have any purity and water content. It is desirable, however, that the water content should be 1% or lower, preferably 2000 ppm or lower, because excess water in the alcohol forms magnesium hydroxide [Mg(OH)$_2$] on the surface of metallic magnesium. Moreover, the water content should preferably be as low as possible, usually 200 ppm or lower, so that the resulting magnesium compound has a good morphology.

The halogen is not particularly limited to, but includes chlorine, bromine and iodine with iodine being particularly preferred.

The halogen-containing compounds are not particularly limited to, but include those having a halogen atom in the chemical formula. In this case the halogens are not particularly limited to, but include chlorine, bromine and iodine. In addition, among the halogen-containing compounds, halogen-containing metal compounds are particularly desirable.

Examples of the halogen-containing compounds which can preferably used, are MgCl$_2$, MgI$_2$, Mg(OEt)Cl, Mg(OEt)I, MgBr$_2$, CaCl$_2$, NaCl and KBr. Of these compounds, MgCl$_2$ and MgI$_2$ are particularly desirable.

The halogen-containing compounds may be used in any form and state, and may have any particle size. For example, it may be used in the form of solution in an alcohol type solvent such as ethanol.

The amount of the alcohol is not specifically limited; however, it usually ranges from 2 to 100 moles, preferably from 5 to 50 moles, per 1 mole of the metallic magnesium. Use of an excess amount of alcohol may give reduced yield of a magnesium compound having a good morphology. With too small amount of alcohol, it is difficult to carry out smooth stirring in a reaction vessel. However, the above-mentioned molar ratio is not limitative.

The amount of halogen used ranges at least 0.0001 gram-atom, preferably at least 0.0005 gram-atom, more preferably at least 0,001 gram-atom, per 1 gram-atom of metallic magnesium. The halogen-containing compounds should be used in an amount of at least 0.0001 gram-atom, preferably at least 0.0005 gram-atom, most preferably at least 0.001 gram-atom, per 1 gram-atom of the metallic magnesium. The use of the amount less than 0.0001 gram-atom cannot be distinguished from the use of halogen as a reaction initiator. Also, in order to obtain solid products having desired particle size, grinding or classification treatment of the magnesium compound is indispensable.

In the present invention, the halogen or the halogen-containing compounds can be used alone or in any combination. In addition, the halogen and the halogen-containing compound can be used together. In the case of using the halogen and the halogen-containing compound together, the total halogen atom amount ranges at least 0.0001 gram-atom, preferably at least 0.0005 gram-atom, more preferably at least 0.01 gram-atom, per gram-atom of metallic magnesium.

The amount of the halogen or the halogen-containing compounds has no upper limit and can be appropriately selected within a range wherein the desired solid product is obtained. In general, an adequate amount of the total halogen atom content is less than 0.06 gram-atom, per 1 gram-atom of metallic magnesium.

In addition, it is possible to freely control the particle size of the resulting solid catalyst by selecting an appropriate amount of the halogen and/or the halogen-containing compound.

The reaction of metallic magnesium, alcohol, and halogen and/or a halogen-containing compound may be carried out by any known methods, for example, a method of reacting metallic magnesium, alcohol, and halogen and/or a halogen-containing compound under refluxing conditions (at about 79° C.) until the reaction system does not evolve hydrogen gas any longer (usually 20 to 30 hours), to obtain a solid product. More specifically, such known methods (in the case of using an iodine-containing compound as a halogen-containing compound) include: a method which comprises adding an iodine-containing compound in solid form to a mixture of alcohol and metallic magnesium, and reacting them under heat-refluxing conditions; a method which comprises adding an alcohol solution of an iodine-containing compound dropwise to a mixture of alcohol and metallic magnesium, and reacting them under heat-refluxing conditions; and a method which comprises adding an alcohol solution of an iodine-containing compound dropwise to a mixture of alcohol and metallic magnesium while heating the mixture.

Regardless of the method selected, the reaction should preferably be carried out in an inert gas atmosphere such as nitrogen and argon and, if necessary, in the presence of an inert organic solvent such as saturated hydrocarbons such as n-hexane.

It is not necessary to place the metallic magnesium, alcohol, and halogen and/or a halogen-containing compound all at once in the reaction vessel. It is possible to place them by portions in the reaction vessel. It is desirable to place all of the alcohol in the reaction vessel at the beginning and then to add metallic magnesium by portions several times. This procedure prevents the reaction system from evolving hydrogen gas in a large amount at one time and hence ensures safety and permits the use of a smaller reaction vessel, without the partial loss of alcohol and halogen an/or a halogen-containing compound by splashing. The number of portions should be properly determined according to the size of the reaction vessel; but it is usually 5 to 10 to avoid unnecessary complexity.

The reaction may be carried out batchwise or continuously. There is a modified method which comprises repeating the steps of adding a small portion of metallic magnesium to alcohol whose whole amount is first placed in a reaction vessel and removing the reaction product.

The thus obtained reaction product (a) may be used for the synthesis of the next solid catalyst component after being subjected to drying or after being subjected to filtration and washing with an inert solvent such as heptane. The obtained solid product (a) can be used as such in the following step without necessity of grinding or classification to obtain desired particle size distribution.

The solid product (a) is almost spherical and has a sharp particle size distribution, with individual particles varying very little in sphericity. In this case, the solid product may preferably be composed of particles which have a sphericity (S) of smaller than 1.60, preferably smaller than 1.40 as defined by the following Formula (1):

$$S = (E_1/E_2)^2 \qquad (1)$$

wherein $E_1$ denotes the projected perimeter of a particle, and $E_2$ denotes the perimeter of the circle of equal projected area of a particle, and a particle size distribution index (P) of smaller than 5.0, preferably smaller than 4.0 as defined by the following Formula (2):

$$P = D_{90}/D_{10} \qquad (2)$$

wherein $D_{90}$ denotes the particle diameter corresponding to a cumulative weight fraction of 90 percent. In other words, the cumulative sum of the weight of particles smaller than the particle diameter defined by $D_{90}$ accounts for 90 percent of the total weight of all the particles. $D_{10}$ is defined in the same way.

The titanium compounds (b) used in the above-mentioned solid catalyst component (A) may be represented by, for example, the following formula:

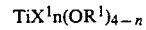

$$TiX^1{}_n(OR^1)_{4-n}$$

wherein $X^1$ is a halogen atom, particularly a chlorine atom; $R^1$ is a hydrocarbon group having 1 to 10 carbon atoms, particularly a straight or branched alkyl group; if there are more than two $R^1$, they may be the same as or different from each other; and n is an integer of 0 to 4.

More specifically, these titanium compounds include $Ti(O-i-C_3H_7)_4$, $Ti(O-C_4H_9)_4$, $TiCl(O-C_2H_5)_3$, $TiCl(O-i-C_3H_7)_3$, $TiCl(O-C_4H_9)_3$, $TiCl_2(O-C_4H_9)_2$, $TiCl_2(O-i-C_3H_7)_2$ and $TiCl_4$.

In the above-mentioned solid catalyst component (A), if desired, any electron donor compounds (c) can be used. The electron donor compounds (c) usually include organic compounds containing an oxygen atom, nitrogen atom, phosphorus atom or sulphur atom. Examples of such compounds are amines, amides, ketones, nitriles, phosphines, phosmylamides, esters, ethers, thioethers, alcohols, thioesters, acid anhydrides, acid halides, aldehydes, organic acids and organosilicon compounds containing a Si—O—C linkage.

More specifically, examples of the electron donor compounds are aromatic carboxylic acids such as benzoic acid and p-oxybenzoic acid;

acid anhydrides such as succinic anhydride, benzoic anhydride and p-toluic anhydride;

ketones having 3 to 15 carbon atoms such as acetone, methyl ethyl ketone, methyl isobutyl ketone, acetophenone, benzophenone and benzoquinone;

aldehydes having 2 to 15 carbon atoms such as acetaldehyde, propionaldehyde, octyl aidehyde, benzaldehyde and naphthaldehyde;

esters having 2 to 18 carbon atoms such as methyl formate, ethyl formate, methyl acetate, ethyl acetate, vinyl acetate, propyl acetate, octyl acetate, cyclohexyl acetate, ethyl propionate, methyl butyrate, ethyl butyrate, ethyl valerate, methyl chloroacetate, ethyl dichloroacetate, methyl methacrylate, ethyl crotonate, ethyl pivalate, dimethyl maleate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, ethyl p-butoxybenzoate, ethyl o-chlorobenzoate, ethyl naphthoate, gamma-butyrolactone, δ-valerolactone, coumarin, phthalide and ethylene carbonate;

mono- and di-esters of aromatic dicarboxylic acids, especially mono- and and di-esters of phthalic acid, such as monomethyl phthalate, dimethyl phthalate, monomethyl terephthalate, dimethyl terephthalate, monoethyl phthalate, diethyl phthalate, monoethyl terephthalate, diethyl terephthalate, monopropyl phthalate, dipropyl phthalate, monopropyl terephthalate, dipropyl terephthalate, monobutyl phthalate, dibutyl phthalate, monobutyl terephthalate, dibutyl terephthalate, monoisobutyl phthalate, diisobutyl phthalate, monoamyl phthalate, diamyl phthalate, monoisoamyl phthalate, diisoamyl phthalate, ethyl butyl phthalate, ethyl isobutyl phthalate and ethyl propyl phthalate; and acid halides having 2-20 carbon atoms, wherein the acid portion (acy group portion) is preferably an aliphatic (including those having a ring such as alicyclic) mono-, di- or trivalent acyl group having 2 to 20 carbon atoms (a hydroxyl group is withdrawn from a mono-, di- or tribasic acid), or an aromatic (including alkaryl and aralkyl) mono-, di- or trivalent acyl group having 7 to 20 carbon atoms (a hydroxyl group is withdrawn from a mono-, di- or tribasic acid), and the halogen is preferably chlorine or bromine, particularly chlorine.

In the present invention, acid halides which can be preferably used include, for example, acetyl chloride, acetyl bromide, propionyl chloride, butyryl chloride, isobutyryl chloride, 2-methylpropionyl chloride, valeryl chloride, isovaleryl chloride, hexanoyl chloride, methylhexanoyl chloride, 2-ethylhexanoyl chloride, octanoyl chloride, decanoyl chloride, undecanoyl chloride, hexadecanoyl chloride, octadecanoyl chloride, benzylcarbonyl chloride, cyclohexanecarbonyl chloride, malonyl dichloride, succinyl dichloride, pentanedioyl dichloride, hexanedioyl dichloride, cyclohexanedicarbonyl dichloride, benzoyl chloride, benzoyl bromide, methylbenzoyl chloride, phthaloyl chloride, isophthaloyl chloride, terephthaloyl chloride and benzene-1,2,4-tricarbonyl chloride. Of these compounds, phthaloyl chloride, isophthaloyl chloride and terephthaloyl chloride are particularly preferable. Phthaloyl chloride is most preferable. In addition, these acid halides may be used alone or in combination with one another.

The electron donor compounds (c) further include ethers having 2 to 20 carbon atoms such as methyl ether, ethyl ether, isopropyl ether, n-butyl ether, amyl ether, tetrahydrofuran, anisole, diphenyl ether, ethylene glycol butyl ether;

acid amides such as acetic acid amide, benzoic acid amide and toluic acid amide;

amines such as tributyl amine, N,N'-dimethylpiperazine, tribenzylamine, aniline, pyridine, pycoline, tetramethyl ethylene diamine;

nitriles such as acetonitrile, benzonitrile, tolunitrile; tetramethyl urea; nitro benzene; lithium butyrate;

organosilicon compounds having a Si—O—C linkage such as trimethylmethoxysilane, trimethylethoxysilane, dimethyldimethoxysilane, dimethyldiethoxysilane, diphenyldimethoxysilane, methylphenyldimethoxysilane, diphenyldiethoxysilane, phenyltrimethoxysilane, gamma-chloropropyltrimethoxysilane, methyltriethoxysilane, ethyltriethoxysilane, vinyltriethoxysilane, butyltriethoxysilane, phenyltriethoxysilane, gamma-aminopropyltriethoxysilane, chlorotriethoxysilane, ethyltriisopropoxysilane, vinyltributhoxysilane, isopropylcyclohexyldimethoxysilane, isobutylcyclohexyldimethoxysilane, tert-butylcyclohexyldimethoxysilane, isopropylcyclohexyldiethoxysilane, isobutylcyclohexyldiethoxysilane, tert-butylcyclohexyldiethoxysilane, methylcyclohexyldimethoxysilane, ethyl silicate, butyl silicate, trimethylphenoxysilane, methyltriallyloxysilane, vinyltris(beta-methoxyethoxy)silane, vinyltriacetoxysilane and dimethyltetraethoxydisiloxane.

Of these compounds, esters, ethers, ketones and acid anhydrides are preferable.

The solid catalyst component (A) can be prepared by any known methods using the above-mentioned solid product (a), the titanium compound (b) and if desired the electron donor compound (c). For example, it is preferable to produce the solid catalyst component (A) by bringing the solid product (a) into contact with the electron donor compound (c), and then bringing the obtained product into contact with the titanium compound (b).

There are no restrictions as to the condition under which the solid product (a) is brought into contact with the electron donor compound (c). Usually, the amount of the electron donor compound (c) is 0.01 to 10 moles, preferably 0.05 to 5 moles, per 1 mol of the solid product (a) in terms of magnesium atom. The contact reaction may be carried out at 0° to 200° C., preferably 30° to 150° C. for 5 minutes to 10 hours, preferably 30 minutes to 3 hours. The reaction may be carried out in an inert hydrocarbon solvent such as pentane, hexane, heptane and octane.

There are no restrictions as to the condition under which the solid product (a) is brought into contact with the titanium compound (b), or the contact product of the solid product (a) and the electron donor compound (c) is brought into contact with titanium compound (b). Usually, the amount of the titanium compound (b) is 1 to 50 moles, preferably 2 to 20 moles, per 1 mol of magnesium in the solid product. The contact reaction is usually carried out at 0° to 200° C., preferably 30° to 150° C. for 5 minutes to 10 hours, preferably 30 minutes to 5 hours.

For the contact reaction, the titanium compound (b) may be used alone as such if it is a liquid (like titanium tetrachloride); otherwise, it may be used in the form of solution in an inert hydrocarbon solvent (such as hexane, heptane and kerosene). Prior to the above-mentioned contact reaction, the solid product (a) may be treated with any one of halogenated hydrocarbons, halogen-containing silicon compounds, halogen gases, hydrogen chloride or hydrogen iodide.

In addition, after the contact reaction, the reaction product should preferably be washed with an inert hydrocarbon (such as n-hexane and n-heptane).

The above-mentioned organometallic compounds (B) which can be preferably used include an organic compound containing a metal belonging to Groups I to III of the Periodic Table. These metals include, for example, lithium, sodium, potassium, zinc, cadmium and aluminum, of which aluminum is preferable. Examples of the organometallic compound (B) include alkyl lithium such as methyl lithium, ethyl lithium, propyl lithium and butyl lithium, and dialkyl zinc such as dimethyl zinc, diethyl zinc, dipropyl zinc and dibutyl zinc.

The organoaluminum compounds which can be used in the present invention are represented by the following formula:

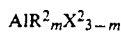

$$AlR^2_m X^2_{3-m}$$

wherein $R^2$ is an alkyl group having 1 to 10 carbon atoms, cycloalkyl group or aryl group; m is an integer of 1 to 3; and $X^2$ is a halogen atom such as chlorine or bromine.

Examples of the organoaluminum compound include trialkylaluminum compounds such as trimethylaluminum, triethylaluminum, triisopropylaluminum, triisobutylaluminum and trioctylaluminum; and dialkylaluminum monohalide compounds such as diethylaluminum monochloride, dipropylaluminum monochloride and dioctylaluminum monochloride.

The above-mentioned electron donor compounds (C) can be used together if desired.

In this case, the above-mentioned electron donor compounds (c) which can be used to prepare the above solid catalyst component (A) can be used as the electron donor compounds (C). The electron donor compound (C) to be used may be the same as or different from the electron donor compounds to be used to prepare the above solid catalyst component (A).

The polymerization conditions for the polypropylene based resins according to the present invention are not particularly limited. For example, using the above-mentioned high stereoregular catalyst, after a crystalline homopolymer or copolymer of propylene is produced in the former stage of polymerization in a homopolymerization vessel, propylene and the other alpha-olefin are subjected to random copolymerization in the presence of the above homopolymer or copolymer in the latter stage of polymerization (Japanese Patent Application No. 106318/1991).

In this case, in the former stage of polymerization, a crystalline homopolymer or copolymer of propylene is produced. However, in this stage, the polymerization can be divided into two or more steps. Further, prior to substantial polymerization, for the purposes of improving catalystic activity, bulk density, flowability or the like, pre-polymerization treatment to bring a catalyst into contact with a small amount of propylene may be performed. One example of the pre-polymerization treatment is described in, for example, Japanese Patent Application Publication No. 45244/1982.

The former stage polymerization can be conducted in the presence or absence of an inert solvent in the liquid phase or gas phase. The suitable amount of each catalyst component can be appropriately selected depending upon its kind or the like.

In the former stage polymerization, to obtain a block copolymer having high stiffness, a crystalline homopolymer or copolymer of propylene is produced. In the case of producing copolymers, comonomers include alpha-olefins other than propylene, such as those having 2 to 10 carbon atoms such as 1-butene, 1-pentene, 1-hexene, 4-methyl-1-pentene, 1-octene and 1-decene.

The polymerization temperature used in producing the homopolymer or copolymer can be appropriately selected. For example, the polymerization temperature may range about 50 to 100° C., preferably about 60° to 90° C. Further, the polymerization pressure can be appropriately selected. For example, the polymerization pressure may range about 1 to 200 Kg/cm$^2$G, preferably about 1 to 100 Kg/cm$^2$G.

In the case of using liquid phase polymerization, propylene or an inert solvent can be used as a liquid solvent. Such inert solvents include, for example, propane, butane, pentane, hexane, heptane, decane and kerosene.

In the latter stage polymerization, in the presence of the crystalline propylene homopolymer or copolymer containing a catalyst obtained in the former stage, random copolymerization propylene and the other alpha-olefin is carried out. The random copolymerization is usually carried out following to the former stage polymerization to produce crystalline propylene homopolymer or copolymer.

The random copolymerization can be carried out in the liquid phase or the gas phase. If the gas phase polymerization is adapted, the whole amount of the copolymer can be introduced into the block copolymer, resulting in high yield with respect to olefins consumed. This is particularly effective for industrial use.

The other alpha-olefins which can be used in the random copolymerization include, for example, ethylene, 1-butene, 1-pentene, 1-hexene, 4-methyl-1-pentene, 1-octene and 1-decene. Preferred is ethylene or a combination of ethylene and a $C_4$–$C_5$ alpha-olefin.

The polypropylene based resin compositions according to the present invention may comprise at least the above-mentioned polypropylene based resin of the present invention, and may comprise if desired EPR, EPDM, polyethylene, EBR, polybutne-1 or the like.

Further, the polypropylene based resin compositions according to the present invention may comprise, if desired, additives such as several stabilizers, pigments, dispersing agents and nucleating agents.

Further, the second embodiment of the present invention provides a polypropylene based resin characterized by comprising:

(1) a propylene polymer having a content of alpha-olefin other than propylene of not more than 4 mole percent, and the following properties (2), (3) and (4):

(2) a pentad fraction (mmmm fraction) measured by $^{13}$C-NMR of not less than 96.0 percent, (3) a main elution fraction peak position of not less than 117.0° C. and a peak half value width of less than 4.0, these values being measured by the temperature raising separation method, and (4) an intrinsic viscosity of not less than 2.0 dl/g, but not more than 5.0 dl/g; and, (5) a rubber content measured by pulse NMR of at least 8 percent.

The second embodiment of the present invention will be described in more detail.

First, each property will be described in detail.

(1) The content of alpha-olefin other than propylene can be same as that described before for the first embodiment of the present invention.

(2) The pentad fraction (mmmm fraction) can be same as that described before for the first embodiment of the present invention.

(3) The Main Elution Peak Position and Peak Half Value Width:

The temperature raising separation method was already described before for the first embodiment of the present invention.

The polypropylene based resins according to the present invention have a main elution peak position of at least 117.0° C., preferably at least 117.5° C., more preferably at least 118.0° C. Further, the peak half value width is less than 4.0, preferably less than 3.8, more preferably less than 3.4. If the main elution peak position is less than 117.0° C., the resultant polymer will have decreased crystallization degree, leading to decrease in stiffness and heat strength. Further, if the peak half value width is 4.0 or more, the stiffness and heat resistance of the resultant polymer will be also decreased to the same level of a conventional polypropylene.

(4) Intrinsic Viscosity [η]"

As used herein, the intrinsic viscosity is a value measured in decalin at 135° C.

The polypropylene based resins according to the present invention have an intrinsic viscosity of 2.0 to 5.0 dl/g, preferably 2.0 to 4.0 dl/g, more preferably 2.0 to 3.5 dl/g. If the intrinsic viscosity is less than 2.0 dl/g, the impact strength of the resultant polymer will be insufficient. If the intrinsic viscosity exceeds 5.0 dl/g, the moldability of the resultant polymer will be poor.

(5) Rubber Component Content:

As used herein, the rubber component content means a value obtained from the Pulse NMR analysis made under the following conditions.

Analysis:

In accordance with the techniques by Nishi et al (K. Fujimoto, T. Nishi and R. Kado, Polym. J., 3,448(1972)), FID (Free Induced Decrease) is separated into three components showing different $^1$H spin-glide relaxation time (T2H). Then, among these three components, a component having the longest T2H is regarded as a rubber component, and the content of such fraction is defined as rubber component content.

The polypropylene based resin according to the present invention have a rubber component content measured by the Pulse NMR of not less than 8 percent, preferably 10 to 30 percent, more preferably 10 to 25 percent. If the rubber component content is less than 8 percent, the Izod impact strength of the resultant polymer will be decreased.

A process for producing the polypropylene based resin having the above properties according to the present invention can be the same as that described before for the first embodiment of the present invention. In this case, a polymerization ratio of propylene to the other olefin may range, in molar ratio, 10/90 to 90/10, preferably 20/80 to 80/20.

Further, the third embodiment of the present invention provides a polypropylene based resin characterized by comprising:

(1) a propylene polymer having a content of alpha-olefin other than propylene of not more than 4 mole percent, and the following properties (2), (3) and (4):

(2) a pentad fraction (mmmm fraction) measured by $^{13}$C-NMR of not less than 96.0 percent, (3) a main elution fraction peak position of not less than 118.0° C. and a peak half value width of less than 3.4, these values being measured by the temperature raising separation method, and (4) an intrinsic viscosity of not less than 0.5 dl/g, but not more than 2.0 dl/g; and, (5) a propylene copolymer having an intrinsic viscosity of not less than 3.0 dl/g.

Further, the polypropylene based resin compositions according to the third embodiment of the present invention comprise at least the above polypropylene based resin, and may comprise if desired the other resins such as EPR, EPDM and polyethylene.

The third embodiment of the present invention will be described in more detail.

First, each property will be described in detail.

(1) The content of alpha-olefin other than propylene can be same as that described before for the first embodiment of the present invention.

(2) The pentad fraction (mmmm fraction) can be same as that described before for the first embodiment of the present invention.

(3) The Main Elution Peak Position and Peak Half Value Width:

The temperature raising separation method was already described before for the first embodiment of the present invention.

The propylene copolymers contained in the polypropylene based resins according to the present invention have a main elution peak position of at least 118.0° C., preferably at least 118.5° C., more preferably at least 119.0° C. Further, the peak half value width is less than 3.4, preferably less than 3.2, more preferably less than 3.0. If the main elution peak position is less than 118.0° C., the resultant polymer will not exhibit effects derived from the limitation of the intrinsic viscosity to a prescribed range, as well as will exhibit insufficient stiffness and heat strength. Further, if the peak half value width is 3.4 or more, the resultant polymer will not exhibit effects derived from the limitation of the intrinsic viscosity to a prescribed range, as well as will exhibit insufficient stiffness and heat strength.

(4) Intrinsic Viscosity [η]"

As used herein, the intrinsic viscosity is a value measured in decalin at 135° C.

The propylene copolymers contained in the polypropylene based resins according to the present invention have an intrinsic viscosity of 0.5 to 2.0 dl/g, preferably 0.7 to 1.5 dl/g, more preferably 0.8 to 1.2 dl/g. If the intrinsic viscosity is less than 0.5 dl/g, the impact strength of the resultant polymer will be insufficient. If the intrinsic viscosity exceeds 2.0 dl/g, balance between stiffness and impact strength of the resultant polymer will be equivalent to that of a conventional polypropylene.

(5) The polypropylene based resins according to the present invention may comprise the other propylene copolymer having the intrinsic viscosity described below in addition to the propylene copolymer having the above-mentioned properties (2), (3) and (4).

As used herein, the intrinsic viscosity is a value measured in decalin at 135° C.

The above-mentioned propylene copolymers have an intrinsic viscosity of at least 3.0 dl/g, preferably at least 3-5 dl/g, more preferably at least 4.0 dl/g. If the intrinsic viscosity is less than 3.0 dl/g, the impact strength of the resultant polymer will be insufficient.

A process for producing the polypropylene based resins having the above-mentioned properties is the same as that described before for the first embodiment of the present invention.

Further, the fourth embodiment of the present invention provides a polypropylene resin characterized by comprising a propylene polymer having:
 (1) a pentad fraction (mmmm fraction) measured by $^{13}$C-NMR of not less than 96.0 percent,
 (2) a main elution fraction peak position of not less than 118.0° C. and a peak half value width of less than 3.4, these values being measured by the temperature raising separation method, and
 (3) a molecular weight distribution index (PDi) of not more than 15, the molecular weight distribution index being calculated in accordance with the following equation:

$$PDi = W2/10W1$$

wherein W1 is an angle frequency when storage elasticity (G') measured by the melt-viscosity method is $2 \times 10^5$ dyn/cm$^2$; and W2 is an angle frequency when the storage elasticity is $2 \times 10^3$ dyn/cm$^2$.

Further, the polypropylene based resin compositions according to the fourth embodiment of the present invention comprise at least the above polypropylene based resin, and may comprise if desired the other resins such as EPR, EPDM and polyethylene.

The fourth embodiment of the present invention will be described in more detail.

First, each property will be described in detail.
 (1) The pentad fraction (mmmm fraction) can be the same as that described before for the first embodiment of the present invention.
 (2) The Main Elution Peak Position and Peak Half Value Width:

The temperature raising separation method was already described before for the first embodiment of the present invention.

The propylene polymers contained in the polypropylene based resins according to the present invention have a main elution peak position of at least 118.0° C., preferably at least 118.5° C., more preferably at least 119.0° C. Further, the peak half value width is less than 3.4, preferably less than 3.1, more preferably less than 3.0. If the main elution peak position is less than 118.0° C., the resultant polymer will have decreased crystallization degree, leading to decrease in stiffness and heat strength. Further, if the peak half value width is 3.4 or more, the stiffness and heat resistance of the resultant polymer will be also insufficient.

(3) Molecular Weight Distribution Index (PDi)

The molecular weight distribution index (PDi) is represented by the following equation:

$$PDi = W2/10W1$$

wherein W1 is an angle frequency when storage elasticity (G') measured by the melt-viscosity method is $2 \times 10^5$ dyn/cm$^2$; and W2 is an angle frequency when the storage elasticity is $2 \times 10^3$ dyn/cm$^2$.

The shearing speed dependability of the storage elasticity (G') is dependent upon the molecular weight distribution. As the melt elasticity on the lower shearing speed side decreases, the relaxation of the molecules to which deformation is applied, occurs faster and the orientation decreases.

The polypropylene according to the present invention have a PDi of not more than 15, preferably not more than 12. If the PDi exceeds 15, the resultant injection-molded article may suffer big warp or deformation.

A process for producing the propylene resins having the above-mentioned properties according to the present invention is the same as that described before for the first embodiment of the present invention.

The polymerization conditions are not particularly limited. The polymerization may be carried out under the same conditions as used for the known process. For example, the polymerization may be performed at an olefin partial pressure higher than the atmospheric pressure, at a temperature of from $-80°$ C. to $+150°$ C., in the gas phase or liquid phase, and, if necessary, in the presence of an inert hydrocarbon diluent.

Further, the fifth embodiment of the present invention provides a polypropylene resin characterized by being composed of a propylene homopolymer having:
 (1) a pentad fraction (mmmm fraction) measured by $^{13}$C-NMR of not less than 96.0 percent,
 (2) a main elution fraction peak position of not less than 118.0° C. and a peak half value width of less than 3.4, these values being measured by the temperature raising separation method, and
 (3) a melt index of not less than 0.01 g/10 min., but not more than 200 g/10 min.

Further, the polypropylene based resin compositions according to the fifth embodiment of the present invention comprise at least the above polypropylene based resin, and may comprise if desired the other resins such as EPR, EPDM and polyethylene.

The fifth embodiment of the present invention will be described in more detail.

First, each property will be described in detail.
 (1) The pentad fraction (mmmm fraction) can be the same as that described before for the first embodiment of the present invention.
 (2) The Main Elution Peak Position and Peak Half Value Width:

The temperature raising separation method was already described before for the first embodiment of the present invention.

The propylene polymers contained in the polypropylene based resins according to the present invention have a main elution peak position of at least 118.0° C., preferably at least 118.5° C., more preferably at least 119.0° C. Further, the peak half value width is less than 3.4, preferably less than 3.1, more preferably less than 3.0. If the main elution peak position is less than 118.0° C., the resultant polymer will have decreased crystallization degree, leading to decrease in stiffness and heat strength. Further, if the peak half value width is 3.4 or more, the stiffness and heat resistance of the resultant polymer will be also insufficient.

(3) Melt Index (MI):

As used herein, the "melt index" means a value measured in accordance with JIS K7210.

The polypropylene of the present invention have a MI of 0.01 to 200 g/10 min., preferably 0.1 to 200 g/10 min., more preferably 1.0 to 150 g/10 min. If the MI is less than 0.01 g/10 min., the resultant polymer may have low stiffness and heat resistance. If the MI exceeds 200 g/10 min., undesirable low molecular weight components will be generated.

A process for producing the propylene resins having the above-mentioned properties according to the present invention is the same as that described before for the first embodiment of the present invention.

The polymerization conditions are not particularly limited. The polymerization may be carried out under the same conditions as used for the known process. For example, the polymerization may be performed at an olefin partial pressure higher than the atmospheric pressure, at a temperature of from $-80°$ C. to $+150°$ C., in the gas phase or liquid phase, and, if necessary, in the presence of an inert hydrocarbon diluent. The polymerization carried out under such conditions gives rise to a polyolefin powder having an almost complete sphericity and a sharp particle size distribution. In other words, the polyolefin powder has a sphericity (S) of smaller than 1.60 and a particle size distribution index (P) of smaller than 5.0, as mentioned above.

Further, the sixth embodiment of the present invention provides a polypropylene resin characterized by being composed of a propylene homopolymer having:
(1) a pentad fraction (mmmm fraction) measured by $^{13}$C-NMR of not less than 96.0 percent,
(2) a main elution fraction peak position of not less than 117.0° C. and a peak half value width of less than 4.0, these values being measured by the temperature raising separation method,
(3) a melt index of not less than 0.01 g/10 min., but not more than 3.0 g/10 min.
(4) melt tension satisfying the following equation:

$$T \geq -5.2 \, logMI + 3.0$$

wherein T is melt-tension measured at 230° C.; and MI is melt index.

Further, the polypropylene based resin compositions according to the sixth embodiment of the present invention comprise at least the above polypropylene based resin, and may comprise if desired the other resins such as EPR, EPDM and polyethylene.

The sixth embodiment of the present invention will be described in more detail.

First, each property will be described in detail.
(1) The pentad fraction (mmmm fraction) can be the same as that described before for the first embodiment of the present invention.
(2) The Main Elution Peak Position and Peak Half Value Width:

The temperature raising separation method was already described before for the first embodiment of the present invention.

The propylene polymers contained in the polypropylene based resins according to the present invention have a main elution peak position of at least 117.0° C., preferably at least 117.5° C., more preferably at least 118.0° C. Further, the peak half value width is less than 4.0, preferably less than 3-8, more preferably less than 3.4. If the main elution peak position is less than 117.0° C., the resultant polymer will have decreased crystallization degree, leading to decrease in stiffness and heat strength. Further, if the peak half value width is 4.0 or more, the stiffness and heat resistance of the resultant polymer will be also insufficient.

(3) Melt Index (MI):

As used herein, the melt index means a value measured in accordance with JIS K7210.

The polypropylene of the present invention have a MI of 0.01 to 3.0 g/10 min., preferably 0.1 to 3.0 g/10 min. If the MI is less than 0.01 g/10 min., the resultant polymer may have low stiffness and heat resistance. If the MI exceeds 3.0 g/10 min., it is not preferable since the melt tension of the resultant polymer will be decreased.

(4) Melt Tension:

In the polypropylene resins according to the present invention, the relation between the melt tension (T) measured at 230° C. and the melt index should satisfy the following equation:

$$T \geq -5.2 \, logMI + 3.0$$

wherein T is melt-tension measured at 230° C.; and MI is melt index.

If the melt tension is less than the value of $(-5.2 \, logMI + 3.0)$, it is not preferable since the products will suffer big draw down during the molding of sheets or blown products.

A process for producing the propylene resins having the above-mentioned properties according to the present invention is the same as that described before for the first embodiment of the present invention.

The polymerization conditions are not particularly limited. The polymerization may be carried out under the same conditions as used for the known process. For example, the polymerization may be performed at an olefin partial pressure higher than the atmospheric pressure, at a temperature of from $-80°$ C. to $+150°$ C., in the gas phase or liquid phase, and, if necessary, in the presence of an inert hydrocarbon diluent.

In this case, it is preferable that the polypropylene of the present invention be substantially produced in one stage polymerization. According to this process, less expensive products having good quality can be produced.

The polyolefin powders obtained as above have an almost complete sphericity and a sharp particle size distribution. In other words, the polyolefin powder has a sphericity (S) of smaller than 1.60 and a particle size distribution index (P) of smaller than 5.0, as mentioned above.

As described before, the polypropylene resins and their compositions according to the present invention, exhibit extremely high stiffness, heat resistance and impact strength with these properties being well balanced.

Further, the polypropylene resins and their compositions according to the present invention exhibit excellent stiffness and heat resistance, as well as good dimensional stability and ability to avoid warping and deformation of the products.

Furthermore, the polypropylene resins and their compositions according to the present invention have extremely high stiffness, heat resistance and melt tension, and also are cost effective.

BEST EMBODIMENT FOR CARRYING OUT THE INVENTION

Figure 1:
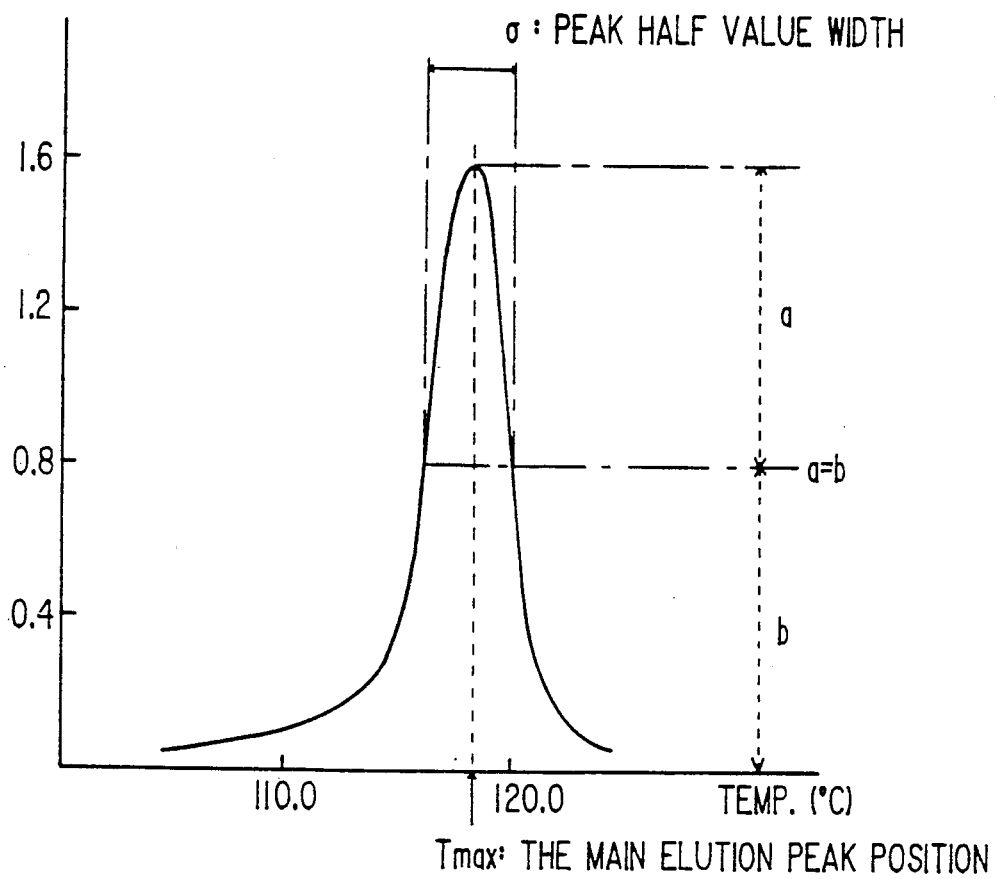
FIG. 1 is an analysis chart showing the main elution peak position and the peak half value width measured by the temperature raising separation method.
Figure 2:
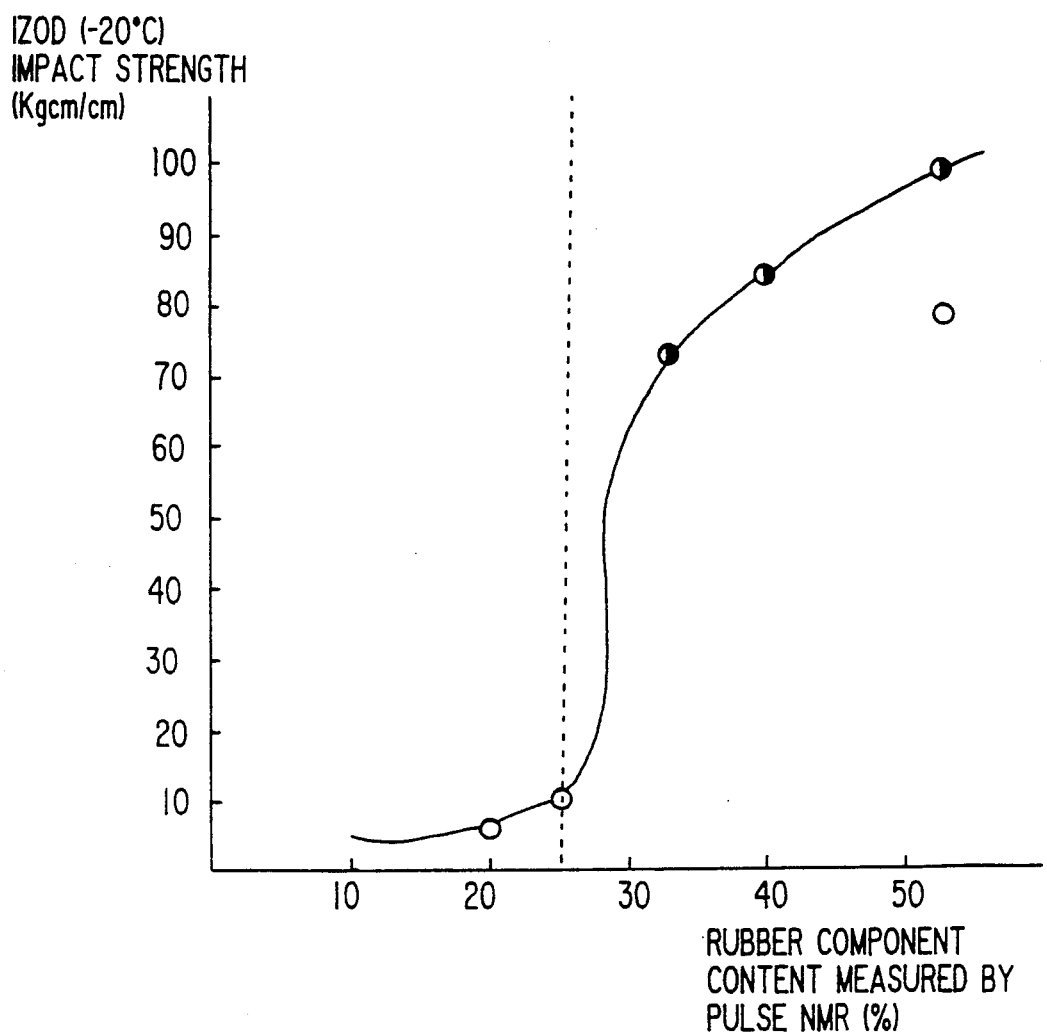
FIG. 2 is a graph showing relationship between the rubber component content and the Izod impact strength.

The present invention will be described in more detail with reference to the following Examples and Comparative Examples; however the present invention is not limited to the following Examples.

In the following Examples and Comparative Examples, the following reagents were used.

Metallic Magnesium: Granular Form (350 micrometers in average particle size.)

Ethanol: Reagent First Grade (Made by Wako Junyaku Co.)

Iodine: Reagent First Grade (Made by Wako Junyaku Co.)

EXAMPLES 1 TO 3 AND COMPARATIVE EXAMPLE 1

(1) Preparation of Solid Product

A glass reactor (inner volume: about 6 liters) equipped with a stirrer, which was sufficiently purged with nitrogen gas, was charged with 2430 g of ethanol, 16 g of iodine and 160 g of metallic magnesium. The reaction was carried out by heating with stirring under refluxing conditions until no hydrogen was evolved any longer to obtain a solid product. The reaction solution containing the solid product was dried under reduced pressure to obtain a solid product (a). The solid product (a) obtained had a sphericity (S) of 1.20 and a particle size distribution index (P) of 1.8.

(2) Preparation of Solid Catalyst Component

A three-mouth glass flask (inner volume: 50 mililiters) sufficiently purged with nitrogen gas, was charged with 16 g of the above-mentioned solid product (a) (not ground), 80 ml of purified heptane, 2.4 ml of silicon tetrachloride and 2.3 ml of diethyl phthalate. After, 77 ml of titanium tetrachloride were added with agitation while the reaction system was kept at 90° C., the reaction was carried out at 110° C. for 2 hours. Then, the solid components were removed from the reaction mixture, and washed with purified heptane heated to 80° C. After 122 ml of titanium tetrachloride were further added, the reaction was further carried out at 110° C. for 2 hours. Then, the reaction product was sufficiently washed with purified heptane to obtain a solid catalyst component (A).

(3) Propylene Polymerization

A styrene steel-made autoclave (inner volume: about 5 liters) was charged with 30 g of polypropylene powders, sufficiently purged with nitrogen gas, and then charged with 2.0 mmol of triethylalLuninum, 0.5 mmol of diphenyldimethoxysilane and 0.01 mmol of the above-mentioned solid catalyst component (A) in terms of titanium atom. Thereafter, 0.7 Kg/cm$^2$G of hydrogen and 27.3 Kg/cm$^2$G of propylene were introduced into the reaction system. Then, the polymerization was carried out under a total pressure of 28.0 Kg/cm$^2$ at 70° C. for 1 hour.

Subsequently, the reaction gas in the reaction system was purged. Then, while ethylene and propylene were introduced at the same volume ratio to adjust the amount of hydrogen so that the intrinsic viscosity as shown in Table 1 was obtained, the polymerization was carried out under a total pressure of 10.0 Kg/cm$^2$ at 55° C. The polymerization time was adjusted so that the resultant polymer had the copolymerized portion ratios as shown in Table 1, to obtain polypropylene based resins.

COMPARATIVE EXAMPLE 2

The polymerization was carried out in the same manner as in Example 1 to obtain a polypropylene based resin, except that the propylene/ethylene volume ratio of the feeding gas for the propylene copolymerization, was changed from 5/5 to 4/6.

COMPARATIVE EXAMPLE 3

(1) Preparation of Solid Catalyst Component

A glass reactor equipped with a stirrer, which was sufficiently purged with nitrogen gas, was charged with 30 g of anhydrous magnesium chloride, 150 ml of purified n-heptane and ethanol whose amount is 6 more moles of the magnesium chloride. The reaction mixture was heated and stirred under refluxing conditions for 2 hours. Thereafter, the reaction mixture was supplied by pressure to a glass reactor equipped with a stirrer, which was charged with 1500 ml of titanium chloride cooled to −20° C., was gradually heated to room temperature with agitation. Then, 160 ml of di-n-butyl phthalate were added. The reaction mixture was heated and stirred at 110° C. for 2 hours.

The solid components obtained were removed from the reaction mixture, and further heated to 110° C. and stirred for 2 hours in 150 ml of titanium tetrachloride. Then, the reaction product was sufficiently washed with purified n-heptane to obtain a solid catalyst component.

(2) Propylene Polymerization

The polymerization was carried out in the same manner as in Example 3 to obtain a polypropylene based resin, except that the solid catalyst component obtained as above was used.

Using the polypropylene based resins obtained in the above Examples 1 to 3 and Comparative Examples 1 to 3, the pentad fraction (mmmm%), the main elution peak position (Tmax) (°C.) and the peak half value width measure by the temperature raising separation method, the intrinsic viscosity (dl/g) and the rubber component content (%) were measured in accordance with the following measurement methods and measurement conditions, respectively. The results are as shown in Table 1.

Pentad Fraction

The pentad fraction was measured using JNM-EX400 (Manufactured by Nihon Electric: 13C nuclear resonance frequency=100 MHz) under the following conditions.

Measurement Mode: Scholar Decoupling Method
Pulse Width: 9.0 $\mu$s (45°)
Pulse Repeating Time: 4 seconds
Integrated Number: 10000 Times Solvent: 1,2,4-Trichlorobenzene/heavy benzene solvent (90/10 Vol. %)
Sample Concentration: 200 mg/3.0 ml Solvent
Measuring Temperature: 130° C.

In this case, the pentad fraction was evaluated by measuring split peaks in the methyl group region from the $^{13}$C-NMR spectrum. In addition, the peaks in the methyl group region were identified according to the description of "Macromolecules, 13(2), 267(1980)(A. Zambelli et al)".

Main Elution Peak Position and Half Value Width

These were measured under the following conditions.
Solvent: Orthodichlorobenzene
Flow Rate: 2 ml/min.
Heat Up Rate: 20° C./hr
Detector: Infrared Detector for Liquid Chlomatography
Measuring Frequency: 3.41 μm
Column: 1.07 cmφ×30 cm
Filler: CHLOMOSOLVE P
Concentration: 7.5 mg/20 ml
Filling Amount: 2 ml
Column Temp. Distribution: Within ±0.2° C.

In this case, a sample solution was introduced at 135° C. into a column, gradually cooled at a rate of 2° C./hr so as to make a polymer adsorbed to a filler and then the column was cooled to room temperature. Thereafter, while the column temperature was elevated under the above conditions, the polymer concentration at each temperature was detected by the infrared detector.

Intrinsic Viscosity [η]

The intrinsic viscosity was measured in decalin at 135° C.

Rubber Component Content By Pulse NMR

The rubber component content was measured with a NMR equipment (CPX-90: Manufactured by Bulcar Co.) under the following conditions.

Measuring Temperature: Room Temperature (about 23° C.)
Pulse Lines used in Measurement: The solid echo method (Refer to, e.g., "Macromolecule Measuring Method—Structure and Physical Properties" Latter Vol., by Macromolecule Association, 1973; and "Lecture for Macromolecule Experiments",
Vol. 12, Nuclear Resonance of Macromolecule, by Kyoritsu, 1975).
90° Pulse Width: 2 Ms
Restoring Time (time required to restore magnetization in the direction of static magnetic field to equilibrium value): 5 second
NMR Sample Tube: Outer Diameter: 10 φ, Inner Diameter: 8 φ, Made of Pyrex glass
Preparation of Samples: A sample prepared by being subjected to press-molding at 220° C. (cooling temp.: 30° C.) was cut into specimens of 1 mm square.

Further, the resin obtained was incorporated with 0.1% of phenol type antioxidant and 0.1% of calcium stearate, pelletized with a 20 mm single axle granule maker, subjected to press board molding (molding temp.: 220° C., cooling temp.: 30° C.), to obtain samples for measurement of physical properties. Then, the physical properties of the samples were measured.

The physical properties measured included tensile elasticity (Kg/cm$^2$), thermal deformation temperature (load flexure temperature) (HDT) (°C.) and Izod impact strength (−20° C). The results are as shown in Table 1. In addition, each of physical properties was evaluated in accordance with the following methods.

Tensile Elasticity

The tensile elasticity was measured in accordance with JIS-K7113.

Heat Deformation Temperature

The heat deformation temperature was measured in accordance with JIS-K7207. In addition, the samples for measurement were not subjected to annealing. The bending stress applied to the samples was set to 4.6 Kg/cm$^2$.

Izod Impact Strength

The Izod impact strength was measured in accordance with JIS-K7110.

TABLE 1

|  | (Example) | | | (Comparative Example) | | |
|---|---|---|---|---|---|---|
|  | 1 | 2 | 3 | 1 | 2 | 3 |
| Propylene Polymer | | | | | | |
| mmmm Fraction (%) | 97.0 | 96.9 | 97.1 | 96.9 | 97.0 | 97.5 |
| σ | 3.0 | 2.9 | 3.8 | 3.1 | 3.2 | 4.2 |
| Tmax (°C.) | 118.8 | 119.0 | 118.6 | 118.9 | 118.8 | 117.0 |
| [η] (dl/g) | 1.0 | 0.9 | 4.0 | 1.1 | 2.5 | 4.0 |
| Propylene Copolymer | | | | | | |
| kind of Comonomer | Ethylene | Ethylene | Ethylene | Ethylene | Ethylene | Ethylene |
| Copolymerized Portion Ratio (%) | 35 | 44 | 56 | 22 | 30 | 55 |
| Feed Gas Formulation (Propylene/Olefin Vol Ratio) | 5/5 | 5/5 | 5/5 | 5/5 | 4/6 | 5/5 |
| [η] (dl/g) | 3.0 | 3.2 | 3.5 | 4.1 | 3.2 | 3.0 |
| Resultant Polymer | | | | | | |
| Rubber Component Content | 33 | 40 | 53 | 20 | 25 | 53 |
| [η] (dl/g) | 1.7 | 1.9 | 3.7 | 1.8 | 2.7 | 3.5 |
| Tensile Elasticity (Kg/cm$^2$) | 10100 | 9600 | 9300 | 14000 | 12200 | 6700 |
| HDT (°C.) | 87 | 85 | 85 | 111 | 96 | 66 |
| Izod (−20° C.) Impact Strength (Kg cm/cm) | 72.8 (NB) | 84.1 (NB) | 98.8 (NB) | 6.3 | 10.3 | 78.5 (NB) |

EXAMPLE 4

(1) Preparation of Solid Product

A solid reaction product was obtained in the same manner as in Example 1. The reaction solution containing the solid product was dried under reduced pressure to obtain a solid product (a). The solid product (a) obtained had a sphericity (S) of 1.20 and a particle size distribution index (P) of 1.8.

(2) Preparation of Solid Catalyst Component

A solid catalyst component (A) was obtained in the same manner as in Example 1.

(3) Propylene Polymerization

A styrene steel-made autoclave (inner volume: about 5 liters) was charged with 30 g of polypropylene powders, sufficiently purged with nitrogen gas, and then charged with 2.0 mmol of triethylaluminum, 0.5 mmol of diphenyldimethoxysilane and 0.01 mmol of the above-mentioned solid catalyst component (A) in terms of titaninum atom. Thereafter, propylene was introduced into the reaction system so as to adjust the amount of hydrogen as shown in Table 2. Then, the polymerization was carried out under a total pressure of 28.0 Kg/cm$^2$ at 70° C. for 1 hour. Subsequently, the reaction gas in the reaction system was purged. Then, while ethylene and propylene were introduced at the same volume ratio to adjust the amount of hydrogen so that the intrinsic viscosity as shown in Table 2 was obtained, the polymerization was carried out under a total pressure of 5.0 Kg/cm$^2$ at 55° C. for 20 minutes, to obtain a polypropylene based resin.

EXAMPLE 5

The propylene polymerization was carried out in the same manner as in Example 4 to obtain a polypropylene resin, except that the polymerization time for the ethylene/propylene copolymerization was changed to 40 minutes.

EXAMPLE 6

The propylene polymerization was carried out in the same manner as in Example 4 to obtain a polypropylene resin, except that the amount of hydrogen used in the propylene homopolymerization stage was increased, and the pressure in the ethylene/propylene copolymerization stage was changed to 10.0 Kg/cm$^2$.

COMPARATIVE EXAMPLE 4

The propylene polymerization was carried out in the same manner as in Example 4 to obtain a polypropylene resin, except that the feed gas formulation in the ethylene/propylene copolymerization stage (propylene/ethylene volume ratio) was changed from 5/5 to 4/6, and the polymerization time was changed to 15 minutes.

COMPARATIVE EXAMPLE 5

A stainless autoclave (inner volume: 10 liters) was charged with 5 l of purified heptane, 5 ml of diethylaluminum chloride (DEAC) and 0.7 g of TiC$^{13}$ catalyst (Type 01: Manufactured by Solbey Co.).

A prescribed amount of hydrogen and propylene were introduced into the reaction system and the polymerization was carried out at 70° C. under a total pressure of 8.0 Kg/cm$^2$ for 90 minutes. Then, the reaction system was purged from the reaction system, and again mixed gas of ethylene and propylene (propylene/ethylene volume ratio of 4/6) was supplied. Then, the polymerization was carried out at 55° C. for 20 minutes while the total pressure was kept at 5 to 7 Kg/cm$^2$. Thereafter, the reaction gas was purged from the reaction system, and 50 ml of butyl alcohol were added. After the reaction mixture was heated and stirred at 70° C. for 30 minutes, a polymer in the slurry was filtered off, and dried under reduced pressure, to obtain a propylene copolymer.

COMPARATIVE EXAMPLE 6

The polymerization was carried out in the same manner as in Comparative Example 5 to obtain a polypropylene resin, except that the feed gas formulation in the ethylene/propylene copolymerization stage (propylene/ethylene volume ratio) was changed to 5/5, and the polymerization time was changed to 40 minutes.

Using the polypropylene based resins obtained in the above Examples 4 to 6 and Comparative Examples 4 to 6, the pentad fraction (mmmm%), the main elution peak position (T max) (°C.) and the peak half value width measured by the temperature raising separation method, intrinsic viscosity (dl/g) and the rubber component content (%) were measured in accordance with the above-mentioned measurment methods and measurment conditions, respectively. The results are as shown in Table 2.

Further, samples for measurement of physical properties were prepared in the same manner as in Example 1, and the physical properties thereof were measured. The results are as shown in Table 2. In addition, each of the physical properties was evaluated in the same manner as in Example 1.

TABLE 2

|  | Example-4 | Example-5 | Example-6 | Comp. Example-4 | Comp. Example-5 | Comp. Example-6 |
|---|---|---|---|---|---|---|
| (Former Stage Polymerization) | | | | | | |
| mmmm Fraction (%) | 96.9 | 97.1 | 96.9 | 96.9 | 95.8 | 95.6 |
| σ | 3.8 | 3.6 | 3.3 | 3.8 | 4.3 | 4.4 |
| Tmax (°C.) | 118.2 | 118.7 | 118.8 | 118.3 | 114.0 | 113.7 |
| $[\eta]_H$ (dl/g) | 3.3 | 3.1 | 2.3 | 3.4 | 3.0 | 3.1 |
| (Latter Stage Polymerization) | | | | | | |
| Kind of Comonomer (—) | Ethylene | → | → | → | → | → |
| Copolymerized Portion Ratio (%) | 10 | 15 | 25 | 11 | 10 | 17 |
| Feed Gas Formulation CO$^2$/Olefin (Vol Ratio) | 5/5 | 5/5 | 5/5 | 4/6 | 4/6 | 5/5 |
| (Resultant Polymer) | | | | | | |
| Rubber Component Content (%) | 9 | 13 | 21 | 6 | 7 | 15 |
| $[\eta]_T$ (dl/g) | 3.2 | 3.1 | 2.5 | 3.4 | 3.1 | 3.0 |
| Tensile Elasticity (Kg/cm$^2$) | 14,100 | 13,000 | 12,300 | 16,500 | 14,900 | 12,000 |
| HDT (°C.) | 110 | 104 | 100 | 122 | 106 | 89 |
| Izod Impact Strength (Kg cm/cm) (−20° C.) | 3.7 | 5.1 | 7.5 | 2.1 | 2.1 | 4.8 |

EXAMPLES 7 TO 9 AND COMPARATIVE EXAMPLES 7 TO 8

(1) Preparation of Solid Product

A solid product (a) was obtained in the same manner as in Example 1. The solid product (a) obtained had a sphericity (S) of 1.20 and a particle size distribution index (P) of 1.8.

(2) Preparation of Solid Catalyst Component

A solid catalyst component (A) was obtained in the same manner as in Example 1.

(3) Propylene Polymerization

A styrene steel-made autoclave (inner volume: about 5 liters) was charged with 30 g of polypropylene powders, sufficiently purged with nitrogen gas, and then charged with 2.0 mmol of triethylaluminum, 0.5 mmol of diphenyldimethoxysilane and 0.01 mmol of the above-mentioned solid catalyst component (A) in terms of titanium atom. After 0.7 Kg/cm$^2$G of hydrogen and 27.3 Kg/cm$^2$G of propylene were introduced into the reaction system, the polymerization was carried out under a total pressure of 28.0 Kg/cm$^2$ at 70° C. for 1 hour.

Subsequently, the reaction gas in the reaction system was purged. Then, while ethylene and propylene were introduced at the same volume ratio to adjust the amount of hydrogen so that the intrinsic viscosity as shown in Table 3 was obtained, the polymerization was carried out under a total pressure of 10.0 Kg/cm$^2$ at 55° C. The polymerization time was adjusted so that the resultant polymer had the copolymerized portion ratios as shown in Table 3, to obtain polypropylene based resins.

COMPARATIVE EXAMPLE 9

(1) Preparation of Solid Catalyst Component

A solid catalyst component was obtained in the same manner as in Example 1.

(2) Propylene Polymerization

The polymerization was carried out in the same manner as in Example 7 to obtain a polypropylene based resin, except that the solid catalyst component obtained was used.

Using the polypropylene based resins obtained in the above Examples 7 to 9 and Comparative Examples 7 to 9, the pentad fraction (mmmm%), the main elution peak position (Tmax) (°C.) and the peak half value width measured by the temperature raising separation method and the intrinsic viscosity (dl/g) were measured in accordance with the above-mentioned measurement methods and measurement conditions, respectively. The results are as shown in Table 3.

Further, samples for measurement of physical properties were prepared in the same manner as in Example 1, and the physical properties thereof were measured. The results are as shown in Table 3. In addition, each of the physical properties was evaluated in the same manner as in Example 1.

TABLE 3

|  | (Example) | | | (Comparative Example) | | |
|---|---|---|---|---|---|---|
|  | 7 | 8 | 9 | 7 | 8 | 9 |
| Propylene Polymer (A) | | | | | | |
| mmmm Fraction (%) | 97.0 | 96.9 | 96.9 | 97.1 | 97.0 | 97.5 |
| σ | 3.0 | 2.9 | 3.1 | 3.1 | 3.2 | 3.6 |
| Tmax (°C.) | 118.8 | 119.0 | 118.9 | 119.1 | 118.8 | 117.0 |
| [η] (dl/g) | 1.0 | 0.9 | 1.1 | 1.2 | 2.5 | 1.0 |
| Propylene Copolymer (B) | | | | | | |
| kind of Comonomer | Ethylene | Ethylene | Ethylene | Ethylene | Ethylene | Ethylene |
| Copolymerized Portion Ratio (%) | 15 | 14 | 22 | 16 | 14 | 15 |
| Feed Gas Formulation (Propylene/Olefin Vol Ratio) | 5/5 | 5/5 | 5/5 | 5/5 | 5/5 | 5/5 |
| [η] (dl/g) | 3.0 | 3.2 | 4.1 | 2.0 | 3.2 | 3.0 |
| Resultant Polymer [η] (dl/g) | 1.3 | 1.2 | 1.8 | 1.3 | 2.6 | 1.3 |
| Tensile Elasticity (Kg/m$^2$) | 16700 | 17600 | 14000 | 16200 | 14700 | 15100 |
| HDT (°C.) | 123 | 122 | 111 | 118 | 110 | 109 |
| Izod (−20° C.) Impact Strength (Kg cm/cm) | 3.5 | 3.1 | 6.3 | 2.2 | 3.4 | 3.0 |

EXAMPLE 10 TO 11

(1) Preparation of Solid Product (a)

A solid product (a) was obtained in the same manner as in Example 1. The solid product (a) obtained had a sphericity (S) of 1.20 and a particle size distribution index (P) of 1.8.

(2) Preparation of Solid Catalyst Component

A solid catalyst component (A) was obtained in the same manner as in Example 1.

(3) Propylene Polymerization

A styrene steel-made autoclave (inner volume: about 5 liters) was charged with 30 g of polypropylene powders, sufficiently purged with nitrogen gas, and then charged with 2.0 mmol of triethylaluminum, 0.5 mmol of diphenyldimethoxysilane and 0.01 mmol of the above-mentioned solid catalyst component (A) in terms of titanium atom. While the amount of hydrogen was adjusted so that the melt index of the resultant polymer as shown in Table 4 was obtained, the polymerization was carried out under a total pressure of 28.0 Kg/cm$^2$ at 70° C. for 2 hours, to obtain a propylene homopolymer.

EXAMPLES 12 TO 13

(1) Preparation of Solid Product (a)

A solid product (a) was obtained in the same manner as in Example 10.

(2) Preparation of Solid Catalyst Component (A)

A solid catalyst component (A) was obtained in the same manner as in Example 10.

(3) Propylene Polymerization

A styrene steel-made autoclave (inner volume: about 5 liters) was charged with 30 g of polypropylene powders, sufficiently purged with nitrogen gas, and then charged with 4.0 mmol of triethylaluminum, 1.0 mmol of diphenyldimethoxysilane and 0.02 mmol of the above-mentioned solid catalyst component (A) in terms of titanium atom. While the amount of hydrogen was adjusted so that the intrinsic viscosity as shown in Table 4 was obtained, the polymerization was carried out under a total pressure of 28.0 Kg/cm$^2$ at 70° C. for 1 hour.

Subsequently, the reaction gas in the reaction system was purged. Then, while ethylene/propylene mixed gas (same volume ratio) was introduced to adjust the amount of hydrogen so that the melt index of the resultant polymer as shown in Table 4 was obtained, the polymerization was carried out under a total pressure of 5.0 Kg/cm$^2$ at 55° C. for 20 minutes, to obtain a copolymerized polymer.

COMPARATIVE EXAMPLES 10 TO 11

A stainless autoclave (inner volume: 10 liters) was charged with 5 l of purified heptane, 5 ml of diethylaluminum chloride (DEAC) and 0.7 g of TiCl$_3$ catalyst (Type 01: Manufactured by Solbey Co.). Then, while the amount of hydrogen was adjusted so that the melt index as shown in Table 4 was obtained, the polymerization was carried out at 70° C. under a total pressure of 8.0 Kg/cm$^2$G for 90 minutes. Thereafter, the reaction gas was purged from the reaction system, and 50 ml of butyl alcohol were added. After the reaction mixture was heated and stirred at 70° C. for 30 minutes, a polymer in the slurry was filtered off, and dried under reduced pressure, to obtain a propylene polymer.

COMPARATIVE EXAMPLES 12 TO 13

The propylene homopolymerization was carried out in the same manner as in Comparative Examples 10 to 11. Then, the reaction gas was purged from the reaction system. While mixed gas of ethylene and propylene (the same volume ratio) was again supplied to the reaction system to keep a total pressure of 5 to 7 Kg/cm$^2$, the polymerization was carried out at 55° C. for 20 minutes. Then, the reaction gas was purged from the reaction system, 50 ml of butyl alcohol were added. After the reaction mixture was heated and stirred at 70° C. for 30 minutes, a polymer in the slurry was filtered off, and dried under reduced pressure, to obtain a propylene polymer.

COMPARATIVE EXAMPLE 14

A polymer prepared in the same manner as in Comparative Example 12 was incorporated with 300 ppm of an organic peroxide (PERKADOX 14: Manufactured by Kayaku Nury Co.), 0.1% of phenol type antioxidant and 0.1% of calcium stearate, pelletized with a 20 mm single axle granule maker, subjected to press board molding.

Using the polypropylene based resins obtained in the above Examples 10 to [13] and Comparative Examples 10 to 14, the pentad fraction (mmmm%), the main elution peak position (Tmax) (° C.) and the peak half value width measured by the temperature raising separation method and the intrinsic viscosity (dl/g) were measured in accordance with the above-mentioned measurement methods and measurement conditions, respectively. The molecular weight distribution index (PDi) and the melt index (MI) (g/10 min.) were measured in accordance with the following measurement methods and measurement conditions. The results are as shown in Table 4.

Molecular Weight Distribution Index (PDi)

The molecular weight distribution index was measured under the following conditions.

Measurment Equipment: SYSTEM-4 manufactured by Leometrix Co.
Shape of Measured Portion: Corn or Plate Shape
Measurment Conditions: 170° C., Sinusoidal Strain

Melt Index (MI)

The melt index was measured in accordance with JIS K-7210.

Further, samples for measurement were prepared in the same manner as in Example 1, and the physical properties thereof were measured. In addition, the resin obtained in Comparative Example 14 was provided as it was for the measurement.

The results are as shown in Table 4. In addition, each of the physical properties was evaluated in accordance with the following methods.

Bending Elasticity

The tensile elasticity was measured in accordance with JIS-K7203.

Heat Deformation Temperature

The heat deformation temperature was measured in the same manner as in Example 1.

Izod Impact Strength

The Izod impact strength was measured in the same manner as in Example 1.

Molding Shrinkage

The molding shrinkage was evaluated by measuring shrinkage (%) in the MD and TD direction after a sample was molded with a metal mold (100 mm×100 mm×2 mm: mold temperature=45° C.) at 220° C.

TABLE 4

|  | Example 10 | Example 11 | Example 12 | Example 13 | Comp. Example 10 | Comp. Example 11 | Comp. Example 12 | Comp. Example 13 | Comp. Example 14 |
|---|---|---|---|---|---|---|---|---|---|
| (Former Stage Polymerization) | | | | | | | | | |
| mmmm Fraction (%) | 96.9 | 96.9 | 97.0 | 97.1 | 95.6 | 96.0 | 96.1 | 95.9 | 96.1 |
| $\sigma$ | 3.1 | 3.2 | 3.0 | 3.0 | 4.4 | 4.8 | 4.4 | 4.2 | 4.4 |
| Tmax (°C.) | 118.7 | 119.1 | 118.8 | 118.9 | 113.7 | 114.1 | 113.9 | 114.2 | 113.9 |
| $[\eta]_H$ (dl/g) | 1.6 | 1.3 | 1.0 | 1.0 | 1.7 | 1.3 | 1.0 | 0.9 | 1.0 |
| (Copolymerized Portion) | | | | | | | | | |
| Kind of Comonomer | — | — | Ethylene | Ethylene | — | — | Ethylene | Ethylene | Ethylene |
| Copolymerized Portion Ratio (%) | — | — | 15 | 16 | — | — | 16 | 14 | 16 |
| $[\eta]_{EP}$ (dl/g) | — | — | 3.2 | 3.1 | — | — | 3.4 | 3.2 | 3.4 |

TABLE 4-continued

|  | Example 10 | Example 11 | Example 12 | Example 13 | Comp. Example 10 | Comp. Example 11 | Comp. Example 12 | Comp. Example 13 | Comp. Example 14 |
|---|---|---|---|---|---|---|---|---|---|
| (Resultant Polymer) | | | | | | | | | |
| Mi (g/10 min) | 9.5 | 23 | 21 | 30 | 9.2 | 24 | 22 | 33 | (34)* |
| PDi (—) | 12.4 | 11.2 | 8.3 | 8.7 | 25.2 | 32.6 | 29.1 | 31.9 | 14.0 |
| Bending Elasticity (Kg/cm$^2$) | 21,500 | 22,000 | 15,900 | 16,300 | 16,000 | 17,400 | 12,000 | 12,400 | 10,900 |
| HDT (°C.) | 135 | 139 | 124 | 123 | 110 | 112 | 100 | 105 | 98 |
| Izod Impact Strength (−20° C.) (Kg cm/cm) | — | — | 3.7 | 3.7 | — | — | 3.5 | 3.4 | 2.9 |
| Molding Shrinkage | | | | | | | | | |
| MD (%) | 1.58 | 1.48 | 1.46 | 1.47 | 1.86 | 1.70 | 1.65 | 1.77 | 1.56 |
| TD (%) | 1.52 | 1.51 | 1.50 | 1.51 | 1.44 | 1.45 | 1.45 | 1.48 | 1.48 |
| MD/TD Ratio | 1.04 | 0.98 | 0.97 | 0.97 | 1.29 | 1.17 | 1.14 | 1.20 | 1.05 |

*Mi After Decomposition

EXAMPLE 14

(1) Preparation of Solid Product (a)

A solid product (a) was obtained in the same manner as in Example 1. The solid product (a) obtained had a sphericity (S) of 1.20 and a particle size distribution index (P) of 1.8.

(2) Preparation of Solid Catalyst Component (A)

A solid catalyst component (A) was obtained in the same manner as in Example 1.

(3) Propylene Polymerization

A styrene steel-made autoclave (inner volume: about 5 liters) was charged with 30 g of polypropylene powders, sufficiently purged with nitrogen gas, and then charged with 2.0 mmol of triethylaluminum, 0.5 mmol of diphenyldimethoxysilane and 0.01 mmol of the above-mentioned solid catalyst component (A) in terms of titanium atom. After 0.7 Kg/cm$^2$G of hydrogen and 27.3 Kg/cm$^2$G of propylene were introduced into the reaction system, the polymerization was carried out under a total pressure of 28.0 Kg/cm$^2$ at 70° C. for 2 hour, to obtain a propylene homopolymer.

EXAMPLE 15

The polymerization was carried out in the same manner as in Example 14 to obtain a propylene homopolymer, except that 0.3 mmol of cyclohexylmethyldimethoxysilane were used instead of diphenyldimethoxysilane in the polymerization.

EXAMPLE 16

The polymerization was carried out in the same manner as in Example 14 to obtain a propylene homopolymer, except that the amount of hydrogen introduced was increased to 2.0 Kg/cm$^2$ and the polymerization temperature was changed to 80° C. in the propylene polymerization (3).

COMPARATIVE EXAMPLE 15

(1) Preparation of Solid Catalyst Component

A glass reactor equipped with a stirrer, which was sufficiently purged with nitrogen gas, was charged with 600 ml of n-heptane, 0.5 mol of diethylaluminum chloride and 1.2 mol of disoamyl ether. Then, the reaction was carried out at room temperature for 5 minutes.

A reactor separately provided, was charged with 4.0 mol of titanium tetrachloride. After the above reaction solution was added dropwise over a period of 180 minutes, the reaction was carried out at room temperature for 80 minutes. Further, the reaction mixture was heated to 75° C. and stirred under heat conditions for 1 hour.

After the solid product obtained was sufficiently washed with purified heptane, 3 l of n-heptane, 160 g of diisoamyl ether and 350 g of titanium tetrachloride were further added. Then, the polymerization was carried out at 65° C. for 1 hour. Further, the reaction mixture was sufficiently washed with heptane again, dried under reduced pressure to obtain a solid catalyst component.

(2) Preparation of Pre-Polymerization Catalyst

A stainless autoclave (inner volume: about 10 liters) was charged with 5 l of n-heptane, 14 g of diethylaluminum chloride and 10 g of the above-mentioned solid catalyst component. Then, hydrogen was introduced to raise a total h pressure to 3 Kg/cm$^2$G, and further propylene was introduced to raise a total pressure to 8 Kg/cm$^2$. Then, the reaction was carried out for 5 minutes. After the reaction system was vacuumed, the solid product was filtered off, and dried under reduced pressure to obtain a pre-polymerization catalyst.

(3) Propylene Polymerization

A 10-liter stainless polymerization reactor equipped with a turbine type stirring wing, which was purged with nitrogen gas, was charged with 4.0 l of n-hexane, then 0.4 g of diethylaluminum monochloride, 0.4 g of the pre-polymerization catalyst obtained as above and 0.44 g of methyl p-toluate. Further, 4.0 Nl of hydrogen was added. Then, the temperature was raised to 70° C. and propylene was supplied to raise a total pressure to 10 Kg/cm$^2$G. After the polymerization was continued at 70° C. under a pressure of 10 Kg/cm$^2$G for 4 hours, 1.0 l of methanol was supplied and the temperature was raised to 80° C. After 30 minutes, 4.0 g of aqueous 20% NaCl solution were added and the mixture was stirred for 20 minutes. Further, alter 2.0 l of pure water were added, the remaining propylene was removed. After the aqueous phase was withdrawn and 2.0 l of pure water were added to wash the reaction product with water by stirring for 10 minutes. The aqueous phase was withdrawn and further the polypropylene-n-hexane slurry was withdrawn. Then, the reaction product was filtered off, and dried to obtain polypropylene powders.

COMPARATIVE EXAMPLE 16

The polymerization was carried out in the same manner as in Comparative Example 15 to obtain polypropylene powders, except that the amount of hydrogen introduced was changed to 4.4 Nl in the propylene polymerization (3).

COMPARATIVE EXAMPLE 17

(1) Preparation of Solid Catalyst Component

A solid catalyst component was obtained in the same manner as in Example 1.

(2) Propylene Polymerization

The polymerization was carried out in the same manner as in Example 14 to obtain propylene powders, except that the solid catalyst component obtained as above was used.

for 3 minutes and then cooled at a heat down rate of 10° C./min.

Melt Temperature

The melt temperature was evaluated by measuring melt peak when a press specimen was heated from 50° C. at a heat up rate of 10° C./min.

Heat Deformation Temperature (HDT)

The heat deformation temperature was measured in the same manner as in Example 1.

TABLE 5

|  | Example | | | Comparative Example | | | |
| --- | --- | --- | --- | --- | --- | --- | --- |
|  | 14 | 15 | 16 | 15 | 16 | 17 | 18 |
| mmmm Fraction (%) | 96.8 | 97.0 | 97.8 | 98.2 | 98.0 | 97.5 | 95.5 |
| σ | 3.2 | 3.0 | 3.1 | 3.6 | 3.9 | 3.6 | 3.6 |
| Tmax (°C.) | 118.3 | 119.1 | 118.9 | 117.6 | 118.2 | 118.1 | 117.5 |
| MI (g/10 min) | 9.9 | 12.0 | 50.2 | 7.1 | 12.0 | 15.2 | 14.3 |
| Tensile Elasticity (Kg/cm$^2$) | 22000 | 23100 | 24300 | 18600 | 19600 | 19900 | 17700 |
| Stress At Yielding Point (Kg/cm$^2$) | 401 | 400 | 412 | 340 | 358 | 375 | 329 |
| DSC (Sample) | | | | | | | |
| Crystallization Temperature (°C.) | 119.8 | 120.4 | 120.7 | 116.6 | 116.0 | 117.7 | 116.0 |
| Melt Temperature (°C.) | 163.0 | 163.6 | 162.1 | 158.7 | 159.0 | 159.5 | 158.1 |
| HDT (°C.) | 127 | 128 | 133 | 112 | 118 | 118 | 105 |

COMPARATIVE EXAMPLE 18

The polymerization was carried out in the same manner as in Comparative Example 17 to obtain polypropylene powders, except that the polymerization temperature was changed to 60° C. in the propylene polymerization (2).

Using the polypropylene based resins obtained in the above Examples 14 to 16 and Comparative Examples 15 to 18, the pentad fraction (mmmm%), the main elution peak position (Tmax) (°C.) and the peak half value width measured by the temperature raising separation method and the melt index (MI) (g/10 min.) were measured in accordance with the above-mentioned measurement methods and measurement conditions, respectively. The results are as shown in Table 5.

Further, samples for measurement were prepared in the same manner as in Example 1, and the physical properties thereof were measured.

The physical properties measured included tensile elasticity (Kg/cm$^2$), stress at yielding point (Kg/cm$^2$), crystallization temperature (°C.) and melt temperature (°C.) measured by the differential thermometer (DSC), and thermal deformation temperature (load flexture temperature) (HDT) (°C). The results are as shown in Table 5. In addition, each of the physical properties was evaluated in accordance with the following methods.

Tensile Elasticity

The tensile elasticity was measured in the same manner as in Example 1.

Stress At Yielding Point

The stress at yielding point was measured in accordance with JIS-K7113.

Crystallization Temperature

The crystallization temperature was evaluated by measuring crystallization peak when a press specimen was heated to 220° C. and kept at the same temperature

EXAMPLE 17

(1) Preparation of Solid Product (a)

A solid product was obtained in the same manner as in Example 1. The reaction solution containing the solid product was dried under reduced pressure to obtain a solid product (a). The solid product (a) obtained had a sphericity (S) of 1.20 and a particle size distribution index (P) of 1.8.

(2) Preparation of Solid Catalyst Component

A solid catalyst component (A) was obtained in the same manner as in Example 1.

(3) Propylene Polymerization

A styrene steel-made autoclave (inner volume: about 5 liters) was charged with 30 g of polypropylene powders, sufficiently purged with nitrogen gas, and then charged with 2.0 mmol of triethylaluminum, 0.5 mmol of diphenyldimethoxysilane and 0.01 mmol of the above-mentioned solid catalyst component (A) in terms of titanium atom. After 0.7 Kg/cm$^2$G of hydrogen and 27.3 Kg/cm$^2$G of propylene were introduced into the reaction system, the polymerization was carried out under a total pressure of 28.0 Kg/cm$^2$ at 70° C. for 2 hour, to obtain a propylene homopolymer.

EXAMPLE 18

The polymerization was carried out in the same manner as in Example 17 to obtain a propylene homopolymer, except that 0.3 mmol of cyclohexylmethyldimethoxysilane were used instead of diphenyldimethoxysilane in the propylene polymerization.

EXAMPLE 19

The polymerization was carried out in the same manner as in Example 17 to obtain a propylene homopolymer, except that the amount of hydrogen introduced was increased to 2.0 Kg/cm$^2$ in the propylene polymerization (3).

COMPARATIVE EXAMPLE 19

A stainless autoclave (inner volume: 10 liters) was charged with 5 l of purified heptane, 5 ml of diethylaluminum chloride (DEAC) and 0.7 g of $TiCl^3$ catalyst (Type 01: Manufactured by Solbey Co.).

After a prescribed amount of hydrogen and propylene were introduced, the polymerization was carried out at 70° C. under a total pressure of 8.0 Kg/cm²G for 90 minutes. Thereafter, the reaction gas was purged from the reaction system, and 50 ml of n-butyl alcohol were added. After the reaction mixture was heated and stirred at the same temperature for 30 minutes, a polymer in the slurry was filtered off, and dried under reduced pressure, to obtain a propylene homopolymer.

COMPARATIVE EXAMPLE 20

(1) Preparation of Solid Catalyst Component

A solid catalyst component was obtained in the same manner as in Example 1.

(2) Propylene Polymerization

The polymerization was carried out in the same manner as in Example 17 (3) to obtain propylene powders, except that the solid catalyst component obtained as above was used.

COMPARATIVE EXAMPLE 21

(1) Preparation of Solid Catalyst Component

A solid catalyst component was obtained in the same manner as in Comparative Example 20.

(2) Propylene Polymerization

The polymerization was carried out in the same manner as in Example 17. However, first the polymerization was carried out under conditions where the hydrogen/propylene ratio was adjusted to provide an intrinsic viscosity of 5.0. Then, a whole amount of the reaction gas was purged from the reaction system and the polymerization was again carried out under conditions where the reaction gas formulation was adjusted to provide an intrinsic viscosity of 1.0 and the former stage/latter stage reaction ratio of 55%/45% was obtained, to give final propylene powders.

COMPARATIVE EXAMPLE 22

(1) Preparation of Solid Catalyst Component

A glass reactor equipped with a stirrer, which was sufficiently purged with nitrogen gas, was charged with 600 ml n-heptane, 0.5 mol of diethylaluminum chloride and 1.2 mol of diisoamyl ether. Then, the reaction was carried out at room temperature for 5 minutes.

A reactor separately provided was charged with 4.0 mol of titanium tetrachloride. After the above reaction solution was added dropwise over a period of 180 minutes, the reaction was carried out at room temperature for 80 minutes. Further, reaction mixture was heated to 75° C. and stirred under heat conditions for 1 hour.

After the solid product obtained was sufficiently washed with purified heptane, 3 l of n-heptane, 160 g of diisoamyl ether and 350 g of titanium tetrachloride were further added. Then, the polymerization was carried out at 65° C. for 1 hour. Further, the reaction mixture was sufficiently washed with heptane again, dried under reduced pressure to obtain a solid catalyst component.

(2) Preparation of Pre-Polymerization Catalyst

A stainless autoclave (inner volume: about 10 liters) was charged with 5 l of n-heptane, 14 g of diethylaluminum chloride and 10 g of the above-mentioned solid catalyst component. Then, hydrogen was introduced to raise a total pressure to 3 Kg/cm²G, and further propylene was introduced to raise a total pressure at 8 Kg/cm². Then, the reaction was carried out for 5 minutes. After the reaction system was vacuumed, the solid product was filtered off, and dried under reduced pressure to obtain a pre-polymerization catalyst.

(3) Propylene Polymerization

A stainless autoclave (inner volume: 10 liters) was charged with 4 l of purified heptane, then 0.4 g of diethylaluminum chloride, 0.4 g of the pre-polymerization catalyst obtained as above and 0.44 g of methyl p-toluate (Manufactured by Inoue Kohryo). Thereafter, in the same manner as in Comparative Example 3, the polymerization was carried out in two stages so as to adjust a ratio of a polymer having an intrinsic viscosity of 5.0 to a polymer having an intrinsic viscosity of 1.0, to 55/45.

The obtained polypropylene slurry was incorporated with 50 ml of n-butyl alcohol, heated to 70° C. and stirred at the same temperature for 30 minutes, filtered off, and dried under reduced pressure, to obtain a propylene homopolymer.

Using the polypropylene based resins obtained in the above Examples 17 to 19 and Comparative Examples 19 to 22, the pentad fraction (mmmm%), the main elution peak position (Tmax) (°C.) and the peak half value width measured by the temperature raising separation method and the melt index (MI) (g/10 min.) were measured in accordance with the above-mentioned measurement methods and measurement conditions, respectively. The melt tension was measured in accordance with the method described below under the conditions described below. The results are as shown in Table 6.

Melt Tension

The melt tension (g) was measured using a melt tension tester (Manufactured by Toyo Seiki). In the measurement, a specimen was melted at 230° C. and extruded from a nozzle (hole diameter: 2.10 mm; length 8.00 mm: cylinder inner diameter: 9.55 mm) at a fixed rate (piston down speed: 10 mm/min.) and then a melted strand extruded through a road cell was withdrawn by a roller (outer diameter: 5.0 cm) rotated at a fixed rate (20 rpm). A stress generated in the above procedure was measured as the melt tension.

Further, samples for measurement were prepared in the same manner as in Example 1, and the physical properties thereof were measured.

The physical properties measured included tensile elasticity (Kg/cm²) and thermal deformation temperature (load flexure temperature (HDT) (°C.). The results are as shown in Table 6. In addition, each of the physical properties was evaluated in the same manner as in Example 1.

TABLE 6

|  | (Example) | | | (Comparative Example) | | | |
|---|---|---|---|---|---|---|---|
|  | 17 | 18 | 19 | 19 | 20 | 21 | 22 |
| mmmm Fraction (%) | 96.9 | 97.0 | 97.0 | 95.7 | 98.0 | 97.8 | 96.6 |
| σ | 3.8 | 3.6 | 3.4 | 4.2 | 4.2 | 5.8 | 5.1 |
| Tmax (°C.) | 118.3 | 118.8 | 118.6 | 113.6 | 116.3 | 115.1 | 117.5 |
| MI (g/10 min) | 0.49 | 0.55 | 2.00 | 0.69 | 1.20 | 0.62 | 0.55 |
| Tensile Elasticity (Kg/cm$^2$) | 18800 | 19000 | 18900 | 14300 | 17100 | 16000 | 15800 |
| Melt Tension (g) | 4.7 | 4.9 | 4.0 | 3.2 | 2.7 | 5.1 | 4.9 |
| HDT (°C.) | 119 | 119 | 121 | 98 | 110 | 106 | 102 |

INDUSTRIAL APPLICABILITY

As mentioned above, the polypropylene and its composition according to the present invention are useful in the fields of several industrial materials, particularly in the fields of automotive, electrical appliances and the like, which require high stiffness and good heat resistance.

We claim:

1. A polypropylene block copolymer of a preformed propylene homopolymer copolymerized with at least one other α-olefin, wherein:
   (1) said preformed propylene homopolymer has a content of alpha-olefin other than propylene of not more than 4 mole percent, and the following properties (2), (3) and (4):
   (2) a pentad fraction (mmmm fraction) measured by $^{13}$C-MNR of not less than 96.0 percent,
   (3) a main elution fraction peak position of not less than 118.0° C. and a peak half value width of less than 4.0, these values being measured by a temperature raising separation method, and
   (4) an intrinsic viscosity of not less than 0.5 dl/g, but not more than 5.0 dl/g; and
   wherein said polypropylene block copolymer has
   (5) a rubber content measured by pulse NMR of more than 25 percent.

2. A polypropylene block copolymer of a preformed propylene homopolymer copolymerized with at least one other α-olefin, wherein:
   (1) said preformed homopolymer has a content of alpha-olefin other than propylene of not more than 4 mole percent, and the following properties (2), (3) and (4):
   (2) a pentad fraction (mmmm fraction) measured by $^{13}$C-MNR of not less than 96.0 percent,
   (3) a main elution fraction peak position of not less than 117.0° C. and a peak half value width of less than 4.0, these values being measured by a temperature raising separation method, and
   (4) an intrinsic viscosity of not less than 2.0 dl/g, but not more than 5.0 dl/g; and
   wherein said polypropylene block copolymer has
   (5) a rubber content measured by pulse NMR of at least 8 percent.

3. A polypropylene block copolymer of a preformed propylene homopolymer copolymerized with at least one other α-olefin, wherein:
   (1) said preformed homopolymer has a content of alpha-olefin other than propylene of not more than 4 mole percent, and the following properties (2), (3) and (4):
   (2) a pentad fraction (mmmm fraction) measured by $^{13}$C-MNR of not less than 96.0 percent,
   (3) a main elution fraction peak position of not less than 119.0° C. and a peak half value width of less than 3.4, these values being measured by a temperature raising separation method, and
   (4) an intrinsic viscosity of not less than 0.5 dl/g, but not more than 2.0 dl/g; and
   (5) said propylene block copolymer has an intrinsic viscosity of not less than 3.0 dl/g.

4. A polypropylene block copolymer resin of a preformed propylene homopolymer random copolymerized with at least one other α-olefin, wherein:
   (1) said preformed propylene homopolymer has a pentad fraction (mmmm fraction) measured by $^{13}$C-MNR of not less than 96.0 percent,
   (2) a main elution fraction peak position of not less than 118.0° C. and a peak half value width of less than 3.4, these values being measured by a temperature raising separation method, and
   (3) a molecular weight distribution index (PDi) of not more than 15, the molecular weight distribution index being calculated in accordance with the following equation:

$$PDI = W2/10W1$$

wherein W1 is an angle frequency when storage elasticity (G') measured by a melt-viscosity method is $2 \times 10^5$ dyn/cm$^2$; and W2 is an angle frequency when the storage elasticity is $2 \times 10^3$ dyn/cm$^2$.

5. A polypropylene block copolymer according to any one of claims 1 to 4, wherein homopolymerization of propylene is carried out substantially in one step.

* * * * *